(12) United States Patent
Nakamura et al.

(10) Patent No.: US 11,721,177 B2
(45) Date of Patent: Aug. 8, 2023

(54) INFORMATION PROCESSING PROGRAM, INFORMATION PROCESSING DEVICE, AND INFORMATION PROCESSING SYSTEM

(71) Applicant: CYGAMES, INC., Tokyo (JP)

(72) Inventors: Takatoshi Nakamura, Tokyo (JP); Yuuki Ogawa, Tokyo (JP); Takashi Fujita, Tokyo (JP); Keiji Kurumizawa, Tokyo (JP); Yuito Kimura, Tokyo (JP)

(73) Assignee: CYGAMES, INC., Tokyo (JP)

( * ) Notice: Subject to any disclaimer, the term of this patent is extended or adjusted under 35 U.S.C. 154(b) by 11 days.

(21) Appl. No.: 17/357,168

(22) Filed: Jun. 24, 2021

(65) Prior Publication Data

US 2021/0319669 A1    Oct. 14, 2021

Related U.S. Application Data

(63) Continuation of application No. PCT/JP2019/049175, filed on Dec. 16, 2019.

(30) Foreign Application Priority Data

Dec. 28, 2018 (JP) ................. 2018-247454

(51) Int. Cl.
    *G07F 17/00*     (2006.01)
    *G07F 19/00*     (2006.01)
    *G07F 17/32*     (2006.01)

(52) U.S. Cl.
    CPC ...... *G07F 17/3293* (2013.01); *G07F 17/3262* (2013.01); *G07F 17/3279* (2013.01)

(58) Field of Classification Search
    CPC ........ A63F 13/58; A63F 13/69; A63F 13/822; A63F 13/79; A63F 13/795; A63F 13/95;
    (Continued)

(56) References Cited

U.S. PATENT DOCUMENTS 5,662,332 A * 9/1997 Garfield .................... A63F 1/00
                                                    273/308
5,951,013 A * 9/1999 Campanella .............. A63F 1/00
                                                    273/303
(Continued)

FOREIGN PATENT DOCUMENTS

JP          5346980 B2     11/2013
JP          5568682 B1      8/2014
(Continued)

OTHER PUBLICATIONS

Pokémon company, "Enjoy 'Shield Battle'", [online], [retrieved Dec. 12, 2018], Internet <URL: https://www.pokemon-card.com/info/2017/20170623_000751.html> (13 pages).

(Continued)

*Primary Examiner* — Milap Shah
(74) *Attorney, Agent, or Firm* — Osha Bergman Watanabe & Burton LLP

(57) ABSTRACT

The present invention appropriately gives game media to a player without lowering a game playability. An information processing program according to the present invention realizes with a computer: a first draw function that determines first game media by performing a draw based on a first draw table on the basis of a predetermined game selection operation by a player; a second draw function that determines second game media by performing a draw based on a second draw table on the basis of the predetermined game selection operation by the player; a medium group creation function that creates a medium group including the first game media determined by the first draw function and the second game media determined by the second draw function; a game control function that runs, by using the medium group, the predetermined game on the basis of an operation by the player; and a management control function that determines that at least one of the first game media determined by the (Continued)

first draw function is managed in association with identification information of the player, and determines whether or not to manage at least one of the second game media determined by the second draw function in association with the identification information of the player on the basis of a game result of the predetermined game.

9 Claims, 10 Drawing Sheets

(58) Field of Classification Search
CPC .......... A63F 1/00; A63F 1/04; A63F 3/00075; A63F 2300/575; G07F 17/3262; G07F 17/3279; G07F 17/3293; G09B 19/22
See application file for complete search history.

(56) References Cited

U.S. PATENT DOCUMENTS

| | | | |
|---|---|---|---|
| 6,254,099 B1* | 7/2001 | Pederson | A63F 3/00075 273/262 |
| 6,322,077 B1* | 11/2001 | Braunlich | A63F 1/02 273/308 |
| 6,419,584 B1* | 7/2002 | Sakamoto | A63F 13/822 463/43 |
| 6,601,851 B1* | 8/2003 | Sakamoto | A63F 1/00 273/308 |
| 6,623,010 B1* | 9/2003 | Holland, Jr. | A63F 1/02 273/306 |
| 6,736,724 B1* | 5/2004 | Erikawa | A63F 13/10 463/32 |
| 7,258,343 B2* | 8/2007 | Hayakawa | A63F 1/06 273/308 |
| 8,702,102 B1* | 4/2014 | Rohrmeister | A63F 1/067 273/296 |
| 8,905,849 B1 | 12/2014 | Coppersmith, III et al. | |
| 9,474,979 B2* | 10/2016 | Yamaguchi | A63F 13/825 |
| 11,305,187 B2* | 4/2022 | Kasawa | A63F 13/77 |
| 2003/0137107 A1* | 7/2003 | Rubin | A63F 1/00 273/292 |
| 2005/0054402 A1* | 3/2005 | Noguchi | A63F 13/45 463/5 |
| 2006/0017229 A1* | 1/2006 | Hayakawa | A63F 1/00 273/292 |
| 2006/0202423 A1* | 9/2006 | Tanaka | A63F 1/00 273/255 |
| 2008/0111306 A1* | 5/2008 | Caputo | A63F 1/00 273/302 |
| 2009/0051114 A1* | 2/2009 | Robbers | A63F 1/00 273/293 |
| 2009/0054124 A1* | 2/2009 | Robbers | G07F 17/3293 463/9 |
| 2012/0264513 A1 | 10/2012 | Kaneyoshi et al. | |
| 2014/0121026 A1* | 5/2014 | Hashimoto | A63F 13/69 463/42 |
| 2014/0235354 A1* | 8/2014 | Takeuchi | A63F 13/822 709/223 |
| 2014/0274401 A1* | 9/2014 | Oono | A63F 13/31 463/40 |
| 2015/0094141 A1* | 4/2015 | Shiratori | A63F 13/822 463/30 |
| 2015/0174494 A1* | 6/2015 | Yamaguchi | A63F 13/58 463/43 |
| 2015/0182864 A1* | 7/2015 | Wada | A63F 13/35 463/9 |
| 2015/0190715 A1* | 7/2015 | Yamaguchi | A63F 13/69 463/43 |
| 2018/0028900 A1* | 2/2018 | Montecillo | A63F 1/00 |
| 2020/0023264 A1* | 1/2020 | Chardon | A63F 1/00 |
| 2020/0078686 A1* | 3/2020 | Morishita | A63F 13/69 |
| 2020/0391100 A1* | 12/2020 | Fujimoto | G06K 7/10 |
| 2021/0001231 A1* | 1/2021 | Kurabayashi | G06N 99/00 |
| 2022/0314127 A1* | 10/2022 | Konishi | A63F 13/795 |

FOREIGN PATENT DOCUMENTS

| | | |
|---|---|---|
| JP | 2016-202972 A | 12/2016 |
| JP | 6392929 B1 | 9/2018 |
| JP | 2018153566 A | 10/2018 |

OTHER PUBLICATIONS

How to use the [MO] Play Lobby, Magic: The Gathering for 30-somethings, Oct. 26, 2015, [online], retrieved Jul. 17, 2019, <URL, https://since30mtg.exblog.jp/23811501/> (6 pages).

Episode 47: Now's the Time to Start Playing Magic Online!& Watch out for Thursday! Tomohiro Kaji's "Digital Magic News", Jul. 31, 2012, [online], retrieved on Jul. 17, 2019, <URL, https://mtg-jp.com/reading/kajidigital/0003807/> (11 pages).

Notice of Reasons for Rejection issued to Japanese Application No. 2018-247454, dated Jul. 30, 2019 (9 pages).

International Search Report issued in International Application No. PCT/JP2019/049175, dated Mar. 10, 2020 (7 pages).

Written Opinion issued in International Application No. PCT/JP2019/049175; dated Mar. 10, 2020 (11 pages).

* cited by examiner

INFORMATION PROCESSING PROGRAM, INFORMATION PROCESSING DEVICE, AND INFORMATION PROCESSING SYSTEM

TECHNICAL FIELD

The present invention relates to an information processing program, an information processing device, and an information processing system.

BACKGROUND ART

There is a technology in which an analog card game using existing cards is realized as a digital card game in an electronic device such as a smartphone or a computer game machine.

Such technology related to a digital card game is described, for example, in Patent Literature 1. In the technology described in Patent Literature 1, a digital card game displays unopened cards in a packaged state (i.e., unopened state), similarly to an analog card game. A player can intuitively know that game media are unopened by referring to a display in which an opened state and an unopened state are distinguished from each other.

Like the technology described in Patent Literature 1, by using a technology in which a digital card game displays an unopened state, it is possible to realize a battle method called a sealed battle in a digital card game. The sealed battle is a battle method in which a predetermined number of unopened card packs, for which cards enclosed therein are unknown, are opened before a battle, and a card deck is constructed by using only cards included in the opened card packs to play the battle (e.g., see Non Patent Literature 1).

CITATION LIST

Patent Literature

PTL 1: Publication of Japanese Patent No. 5346980
NPL 1: The Pokémon Company, "Let's enjoy sealed battles", [online], [retrieval date: 12 Dec. 2018], Internet ⟨URL: https://www.pokemon-card.com/info/2017/20170623_000751.html⟩

DISCLOSURE OF THE INVENTION

Problems to be Solved by the Invention

However, since only a predetermined number of card packs are opened in a sealed battle, high-rarity cards (i.e., cards having high rarity) do not often appear compared with ordinary battle methods in which it is possible to use cards arbitrarily selected from all cards owned by a player. Thus, in the sealed battle, there are fewer situations in which high-rarity cards are used in a game, whereby game playability is lowered.

Considering this, when many high-rarity cards are included in a card pack to be used for the sealed battle, the player can easily obtain the high-rarity cards, whereby a game playability in ordinary battle methods is lowered.

It is not possible to solve these problems by merely realizing a sealed battle in an analog card game in a digital card game. The present invention has been made in view of the situation described above, and it is an object thereof to appropriately give game media to a player without lowering a game playability.

Solution to Problem

In order to achieve the above-described object, an information processing program according to an aspect of the present invention realizes, with a computer:

a first draw function that determines first game media by performing a draw based on a first draw table on the basis of a predetermined game selection operation by a player;

a second draw function that determines second game media by performing a draw based on a second draw table on the basis of the predetermined game selection operation by the player;

a medium group creation function that creates a medium group including the first game media determined by the first draw function and the second game media determined by the second draw function;

a game control function that runs, by using the medium group, the predetermined game on the basis of an operation by the player; and a management control function that determines that at least one of the first game media determined by the first draw function is managed in association with identification information of the player, and determines whether or not to manage at least one of the second game media determined by the second draw function in association with the identification information of the player on the basis of a game result of the predetermined game.

Effects of the Invention

According to the present invention, it is possible to appropriately give game media to a player without lowering a game playability.

PREFERRED MODE FOR CARRYING OUT THE INVENTION

Figure 1:
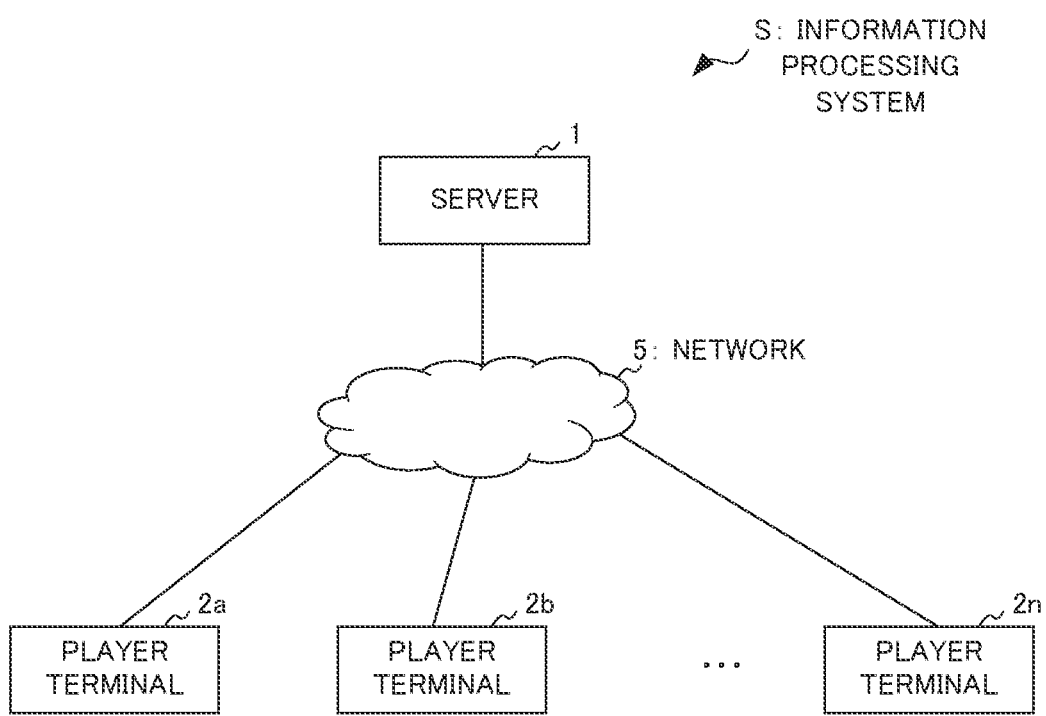
FIG. 1 is a block diagram showing the overall configuration of an information processing system according to an embodiment of the present invention.

An embodiment of the present invention will be described below with reference to the drawings.
[Overall Configuration of the System]
The overall configuration according to this embodiment will be described with reference to FIG. 1. FIG. 1 is a block diagram showing the overall configuration of an information processing system S according to this embodiment.

As shown in FIG. 1, the information processing system S is configured to include a server 1, n (n is an arbitrary integer greater than or equal to one) player terminals 2, and a network 5.

The information processing system S is what is called a client-server system. The information processing system S is realized by mutually carrying out communication between the n player terminals 2 acting as clients and the server 1 via the network 5.

The server 1 is realized, for example, by a server device. Furthermore, the player terminals 2 are realized, for example, by smartphones, non-portable or portable game machines, or personal computers. Furthermore, the network 5 is realized, for example, by a network such as a LAN (Local Area Network), the Internet, or a mobile phone network, or a network formed by combining these types of networks.

Figure 2:
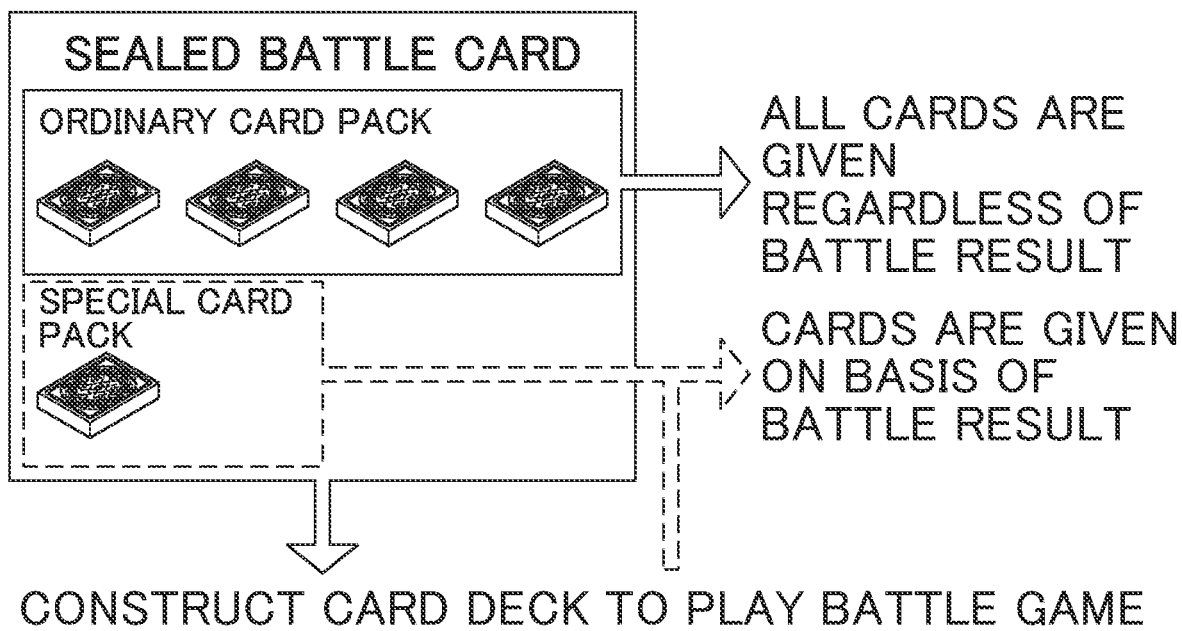
FIG. 2 is a conceptual diagram showing the outline of a sealed battle realized by the information processing system according to the embodiment of the present invention.

In the drawings, a player terminal 2a, a player terminal 2b, and a player terminal 2n are shown as the n player terminals 2. In the following description, however, these n player terminals 2 will be simply referred to as the "player terminals 2", with the reference signs partially omitted, in the case where no distinction is made thereamong.
[Overview of this Embodiment]
Next, an overview of this embodiment will be described with reference to FIG. 2. FIG. 2 is a conceptual diagram showing an overview of a sealed battle realized by the information processing system S according to this embodiment.

In the information processing system S, through cooperation between the server 1 and the player terminal 2, a predetermined game ("sealed battle" as an example here) using a plurality of game media ("cards" as an example here) is provided to a player.

In this sealed battle, as shown in FIG. 2, an ordinary card pack and a special card pack are used as packs in which cards to be used in the sealed battle are contained. Note that, as a presupposition, these card packs are card packs in which electronic cards for digital card games are contained, and are not real cards used for analog card games.

In the ordinary card pack, the appearance rate of high-rarity cards is set to be lower than the appearance rate of low-rarity cards. Thus, when the ordinary card pack is opened, the possibility that low-rarity cards appear is higher than the possibility that high-rarity cards appear.

Meanwhile, in the special card pack, the appearance rate of high-rarity cards is set to be higher than the appearance rate of low-rarity cards. That is, in the special card pack, the appearance rate of low-rarity cards is set to be more than or equal to zero, and less than the appearance rate of low-rarity cards in the ordinary card pack.

In the following descriptions, as an example, the case where the appearance rate of low-rarity cards is set to zero and the appearance rate of high-rarity cards is set to be a value more than zero will be assumed. Thus, in the case where the special card pack is opened, high-rarity cards always appear.

A player constructs a card deck by selecting arbitrary cards from all cards that have appeared by opening these individual card packs. Then, the player plays a battle game by using the constructed card deck.

Furthermore, the cards that have appeared by opening these individual card packs are not only available in the sealed battle, but also given to a player so that the player can use these cards in games other than the sealed battle. That is, after the cards are given to the player, the player can arbitrarily use these cards in games other than the sealed battle within the rules of these games.

However, all cards are not always given to the player. Specifically, all cards that have appeared from the ordinary card pack (hereinafter referred to as "ordinary cards") are given to the player playing the sealed battle regardless of the battle result of the sealed battle. Meanwhile, cards that have appeared from the special card pack (hereinafter referred to as "special cards") are given to the player on the basis of the battle result of the sealed battle. For example, a predetermined number of cards are given to the player who won the sealed battle a plurality of times consecutively.

As described above, it becomes possible for the player to use the given cards in games other than the sealed battle.

However, although the player can use, in the sealed battle, cards that have not been given to the player, the player cannot use these cards in games other than the sealed battle.

By using a plurality of kinds of card packs, i.e., the ordinary card pack and the special card pack as described above, it is possible to play a sealed battle by using high-rarity special cards that surely appear from the special card pack. Thus, it is possible to solve the above-described problem that, in a general sealed battle, there are fewer situations in which high-rarity cards are used in a game, whereby a game playability is lowered.

Furthermore, by using a plurality of kinds of card packs, it is possible to present candidates for a reward that can be acquired by winning the game to a player in advance.

Furthermore, it is possible to let the player use a special card to be a reward candidate in advance. Thus, it is possible to motivate the player to win the sealed battle.

Furthermore, although a plurality of kinds of card packs are used, all ordinary cards that appear in accordance with rarity are given to the player, whereas special cards that do not appear in accordance with rarity are given only in the case where a condition based on the battle result of the sealed battle is satisfied. Thus, it is possible to solve the above-described problem that, when many high-rarity cards are included in a card pack to be used for the sealed battle, the player can easily own high-rarity cards, whereby a game playability in an ordinary battle method is lowered.

As described above, the information processing system S not only realizes a sealed battle in an analog card game in a digital card game, but also realizes a sealed battle using a plurality of kinds of card packs, i.e., an ordinary card pack and a special card pack.

Thus, according to the information processing system S, it is possible to appropriately give game media (cards in this case) to a player without lowering a game playability.

[Hardware Configuration]

Figure 3:
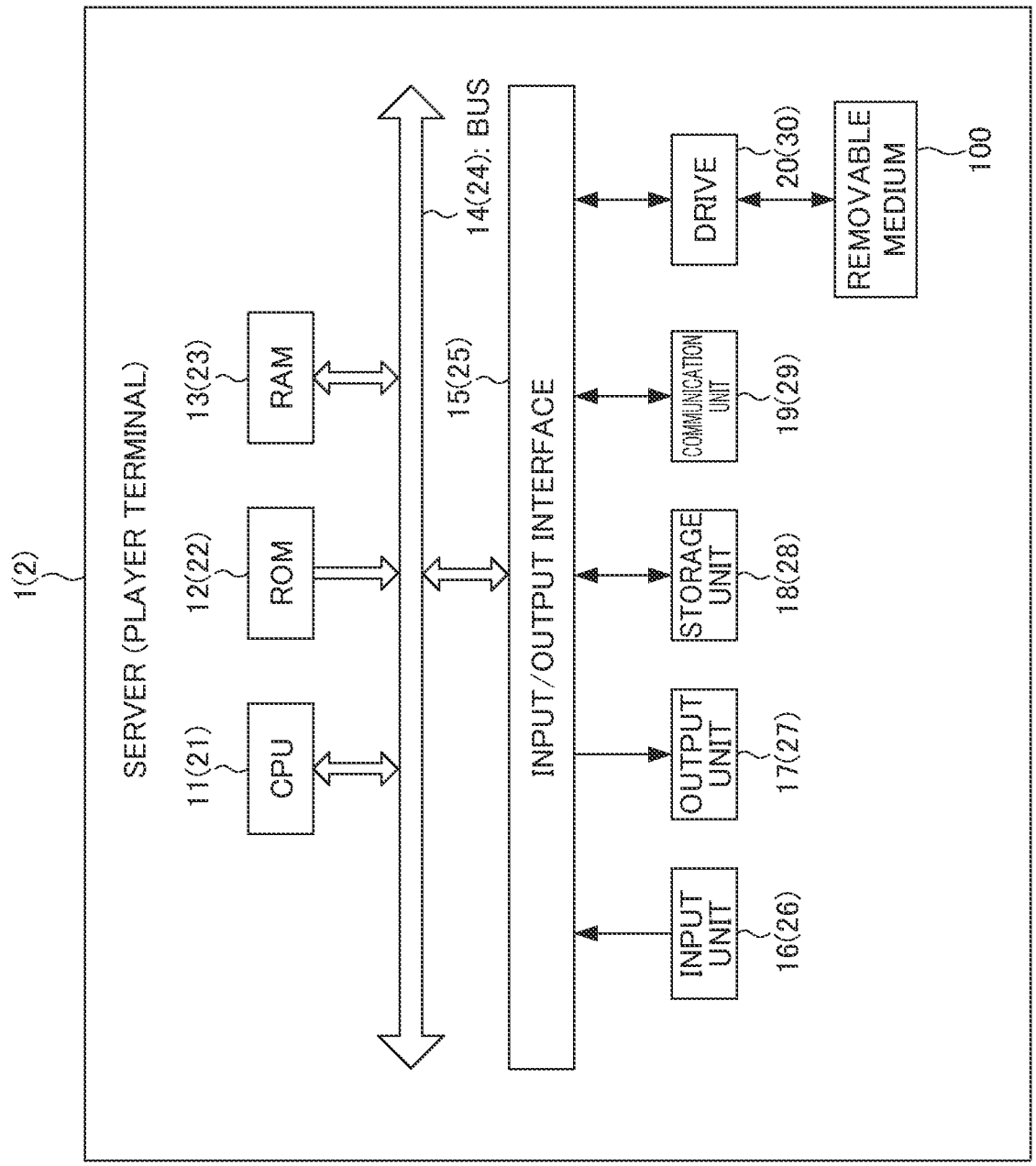
FIG. 3 is a block diagram showing the hardware configurations of a server and a player terminal included in the information processing system according to the embodiment of the present invention.

Next, a hardware configuration in this embodiment will be described with reference to FIG. 3. FIG. 3 is a block diagram showing the hardware configurations of the server 1 and the player terminal 2 included in the information processing system S according to the embodiment of the present invention. In the figure, reference signs corresponding to the hardware of the server 1 are shown without adding parentheses, and reference signs corresponding to the hardware of the player terminal 2 are shown with added parentheses.

First, the hardware configuration of the server 1 will be described. As shown in FIG. 3, the server 1 includes a CPU (Central Processing Unit) 11, a ROM (Read Only Memory) 12, a RAM (Random Access Memory) 13, a bus 14, an input/output interface 15, an input unit 16, an output unit 17, a storage unit 18, a communication unit 19, and a drive 20.

The CPU 11 executes various kinds of processing according to programs recorded in the ROM 12 or programs loaded from the storage unit 18 into the RAM 13.

The RAM 13 stores, as appropriate, data, etc. needed for the execution of various kinds of processing by the CPU 11.

The CPU 11, the ROM 12, and the RAM 13 are connected to each other via the bus 14. The input/output interface 15 is also connected to the bus 14. The input unit 16, the output unit 17, the storage unit 18, the communication unit 19, and the drive 20 are connected to the input/output interface 15.

The input unit 16 is formed of various kinds of buttons, a touchscreen, a microphone, or the like, and accepts input of various kinds of information in accordance with instruction operations performed by the administrator of the server 1 or the like. Alternatively, the input unit 16 may be realized by an input device, such as a keyboard or a mouse, that is independent of a main unit accommodating the other units of the server 1.

The output unit 17 outputs image data or music data to a display, a speaker, or the like. The image data or music data output from the output unit 17 is output from the display, the speaker, or the like in a form recognizable by the player, such as an image or music.

The storage unit 18 is formed of a semiconductor memory, such as a DRAM (Dynamic Random Access Memory), and stores various kinds of data.

The communication unit 19 realizes communication that is carried out with other devices. For example, the communication unit 19 carries out communication mutually with the player terminals 2 via the network 5.

The drive 20 is provided as needed and as appropriate. A removable medium 100 formed of a magnetic disk, an optical disk, a magneto-optical disk, a semiconductor memory, or the like is loaded, as appropriate, in the drive 20. The removable medium 100 stores programs for executing games and various kinds of data, such as image data. The programs and the various kinds of data, such as image data, read by the drive 20 from the removable medium 100, are installed in the storage unit 18, as needed.

Next, the hardware configuration of the player terminal 2 will be described. As shown in FIG. 3, the player terminal 2 includes a CPU 21, a ROM 22, a RAM 23, a bus 24, an input/output interface 25, an input unit 26, an output unit 27, a storage unit 28, a communication unit 29, and a drive 30. These units individually have functions equivalent to those of the units having the same names and different reference signs in the server 1 described above. Thus, repeated descriptions will be omitted.

Note that, in the case where the player terminal 2 is configured as a portable device, the hardware units of the player terminal 2, a display, a speaker, and a battery that supplies power to these components may be realized in the form of an integrated device.

[Functional Configuration]

Next, the functional configuration of the server 1 and the functional configuration of the player terminal 2 will be described with reference to FIG. 4.

Figure 4:
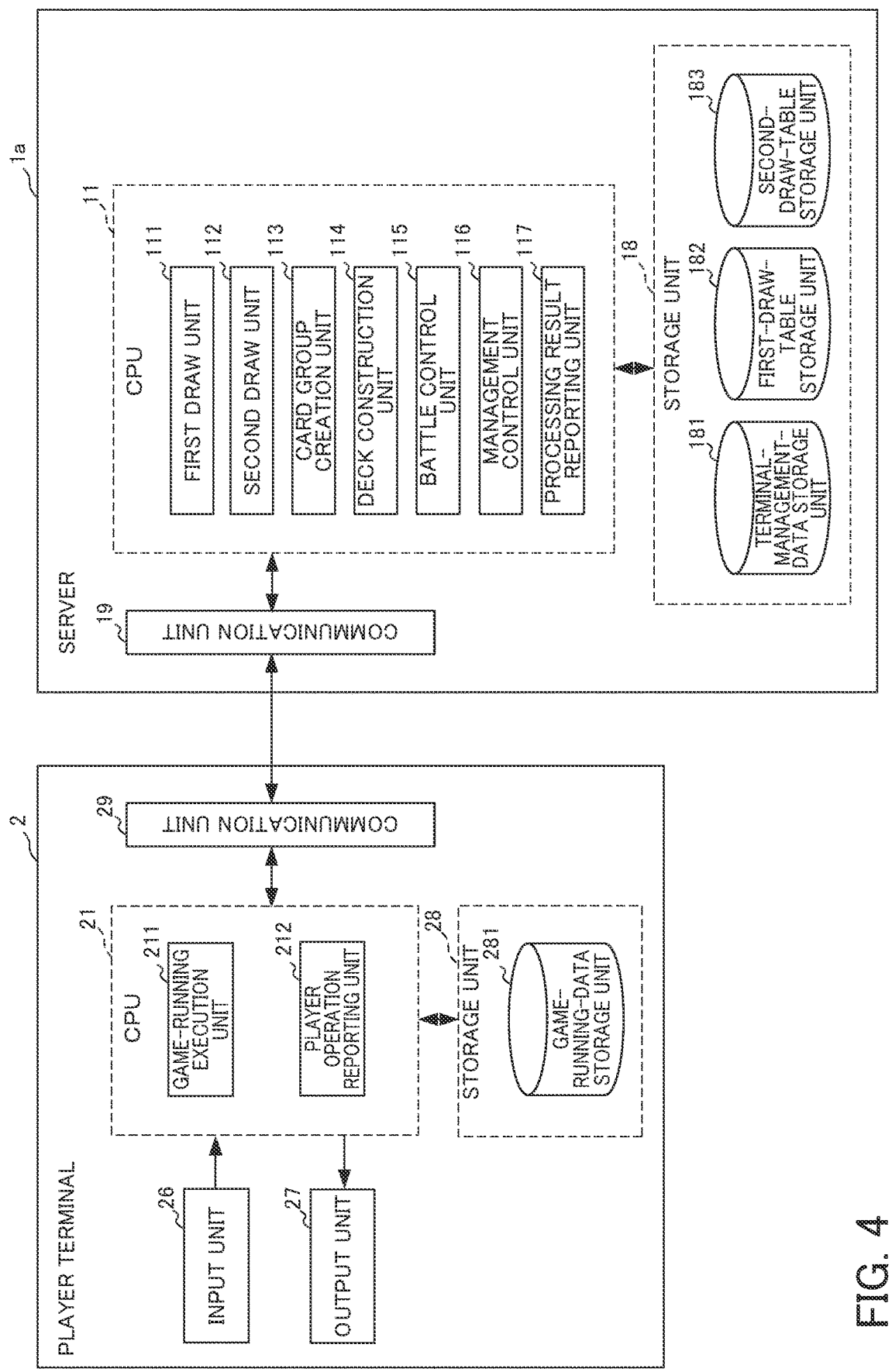
FIG. 4 is a functional block diagram showing, of the functional configurations of the server and the player terminal in FIG. 3, a functional configuration for executing sealed battle provision processing.

FIG. 4 is a functional block diagram showing, of the functional configuration of the server 1 and the functional configuration of the player terminal 2 shown in FIG. 1 or FIG. 3, a functional configuration for executing sealed battle provision processing.

Here, the sealed battle provision processing is a series of processing steps for providing a sealed battle using an ordinary card pack and a special card pack to a player.

Note that, the server 1 in this embodiment and the server 1 in a first modification, which will be described later, have a common hardware configuration but have partially different functional configurations. Thus, in the following description, the server 1 in this embodiment will be referred to as a "server 1a" in which "a" has been appended. Meanwhile, the server 1 in the first modification, which will be described later, will be referred to as a "server 1b" in which "b" has been appended.

First, the functional configuration of the player terminal 2 will be described.

In the case where the sealed battle provision processing is executed, a game-running execution unit 211 and a player operation reporting unit 212 function in the CPU 21, as shown in FIG. 4. These functional blocks transmit and receive information to and from each other as needed.

Furthermore, a game-running-data storage unit 281 is set in an area of the storage unit 28.

The game-running execution unit 211 executes processing for running games. The game-running execution unit 211 runs the games on the basis of game software included in the game-running-data storage unit 281, which will be described later, the contents of player operations concerning the games, input from the input unit 26, and the processing results of the functional blocks included in the server 1a, reported from the processing result reporting unit 117, which will be described later.

Furthermore, as the games are run, the game-running execution unit 211 executes control processing for generating game images from image data included in the game-running-data storage unit 281, which will be described later, and for displaying the generated images on the display connected to the output unit 27. Similarly, as the games are run, the game-running execution unit 211 executes control processing for generating game music and audio from music data and audio data included in the game-running-data storage unit 281, which will be described later, and outputting the generated music and audio from the speaker connected to the output unit 27.

Here, in this embodiment, predetermined parameters in the games run by the game-running execution unit 211 are managed by the server 1a. For example, the server 1a manages a parameter indicating which cards are owned by a player, various kinds of parameters for cards, characters, or the like owned by the player, parameters indicating past game results in battle games, such as winning or losing, and a parameter corresponding to the amount of an in-game currency owned in the games.

Thus, in the case where processing involving changes in these predetermined parameters (e.g., processing involving changes in associations between player IDs and card IDs, which are information indicating card owning states, processing involving increases or decreases in the values of the parameters, or processing involving changes in flags indicating the states of the parameters) occurs in the games, the game-running execution unit 211 carries out communication with the server 1a to update the parameters managed by the server 1a. Then, the game-running execution unit 211 receives the updated parameters from the server 1a and continues to run the games in accordance with the updated parameters.

For example, a draw for determining cards to appear from each card pack, an offense and a defense against an enemy in a battle game included in a sealed battle, winning or losing in a battle game, and the like are kinds of processing involving changes in the predetermined parameters. Thus, in the case where these kinds of processing involving changes in the predetermined parameters occur, the game-running execution unit 211 carries out communication with the server 1a to update the parameters.

In this embodiment, the game-running execution unit 211 assumes that a game to be run is what is called a multi-play digital card game in which the opponent of a sealed battle is another player using another player terminal 2.

However, without limitation to this game, the game-running execution unit 211 may further run another game. For example, the game-running execution unit 211 may further run a digital card game in which it is possible to employ an ordinary battle method, which allows a player to use cards arbitrarily selected from all cards owned by the player. Alternatively, for example, the game-running execution unit 211 may further run a digital card game in which there is a battle against an NPC (Non Player Character).

The player operation reporting unit 212 reports the content of a player selection to the server 1a. The player operation reporting unit 212 accepts, for example, a selection operation for selecting a sealed battle as a game to play, a selection operation for selecting cards from a card group to construct a card deck in the sealed battle, an operation for starting a battle using the card deck constructed in the sealed battle, or various kinds of instruction operations in the battle, on the basis of a player operation input from the input unit 26. Then, the player operation reporting unit 212 transmits the content of the accepted player selection to the server 1a to report the content of the player selection to the server 1a.

The communication by the game-running execution unit 211 and the player operation reporting unit 212 with the server 1a is carried out by using the communication unit 29. Although the network 5 for realizing communication is present between the player terminal 2 and the server 1a, as described earlier with reference to FIG. 1, the network 5 is not shown in FIG. 4.

The game-running-data storage unit 281 stores various kinds of data needed by the game-running execution unit 211 for running games (a sealed battle here, as described above). Examples of the various kinds of data for running the games include game software constituted of programs for executing the game, as well as image data, music data, and audio data for generating game images and sounds. Furthermore, in the case where at least some card designs, characters, or backgrounds are displayed by using three-dimensional computer graphics in the game, the game-running-data storage unit 281 also stores polygon data, texture data, etc. for realizing the display based on three-dimensional computer graphics.

Although the various kinds of data for running the games may be stored only in the game-running-data storage unit 281 of the storage unit 28, the various kinds of data may be read from the removable medium 100 by the drive 20, as appropriate. Alternatively, the various kinds of data may be transmitted to the player terminal 2, as appropriate, from the server 1a or from another device that is not shown, such as a server, by way of communication via the communication unit 29. That is, the various kinds of data may be downloaded as needed and as appropriate, such as when the games are installed or when the versions of the games are upgraded.

Next, the functional configuration of the server 1a will be described.

In the case where the sealed battle provision processing is executed, a first draw unit 111, a second draw unit 112, a card group creation unit 113, a deck construction unit 114, a battle control unit 115, a management control unit 116, and a processing result reporting unit 117 function in the CPU 11, as shown in FIG. 4. These functional blocks transmit and receive information to and from each other as needed. Furthermore, a terminal-management-data storage unit 181, a first-draw-table storage unit 182, and a second-draw-table storage unit 183 are set in an area of the storage unit 18.

In the case where an ordinary card pack is opened, the first draw unit 111 performs a draw (hereinafter referred to as a "first draw") for determining ordinary cards that are to appear from this ordinary game pack. The first draw by the first draw unit 111 is performed on the basis of a first draw table stored in the first-draw-table storage unit 182. Here, as described above with reference to FIG. 2, in an ordinary card pack, the appearance rate of high-rarity ordinary cards is set to be lower than the appearance rate of low-rarity ordinary cards.

That is, in the first draw table, the winning probability of high-rarity ordinary cards is set to be lower than the winning probability of low-rarity ordinary cards.

Thus, in the case where an ordinary game pack is opened, ordinary cards appear with a rarity-based probability.

Furthermore, in this embodiment, an attribute is set for each card regardless of whether the card is an ordinary card or a special card. For example, an attribute is set on the basis of the tribe of a character described on the card, a group to which the character belongs, described on the card, the performance characteristic of the card, the effect of the card, or the like. Furthermore, in this embodiment, a player is allowed to use cards having an attribute selected by the player, and is not allowed to use cards having an unselected attribute.

For this purpose, in this embodiment, the first-draw-table storage unit 182 stores a plurality of first draw tables corresponding to individual attributes. Furthermore, before the draw by the first draw unit 111, the player is allowed to select an attribute of cards to be used. Then, the first draw unit 111 performs a first draw by using a first draw table corresponding to this attribute selected by the player (i.e., a table that has been set such that only ordinary cards having the attribute selected by the player are drawn).

This allows the player to use cards having an attribute according to the play style or preference of the player, thereby improving a game playability.

Note that there may be cards that are available regardless of the attribute selected by the player.

In this case, in each of the plurality of first draw tables corresponding to individual attributes, in addition to cards corresponding to an attribute, cards that are available regardless of this attribute may be set to be drawn.

When ordinary cards that are to appear from the ordinary game pack are determined by the first draw, the first draw unit 111 reports the determined ordinary cards to the card group creation unit 113, the management control unit 116, and the processing result reporting unit 117.

In the case where a special card pack is opened, the second draw unit 112 performs a draw (hereinafter referred to as a "second draw") for determining ordinary cards that are to appear from this special game pack.

The second draw by the second draw unit 112 is performed on the basis of a second draw table stored in the second-draw-table storage unit 183. Here, as described above with reference to FIG. 2, in a special card pack, the appearance rate of high-rarity cards is set to be higher than the appearance rate of low-rarity cards. That is, in a special card pack, the appearance rate of low-rarity cards is set to be more than or equal to zero, and less than the appearance rate of low-rarity cards in an ordinary card pack. As described above, in this description, as an example, the appearance rate of low-rarity cards is set to zero, and the appearance rate of high-rarity cards is set to be a value more than zero. That is, in the second draw table, the winning probability of high-rarity cards is set to be a value more than zero, and the winning probability of low-rarity cards is set to be zero. Thus, in the case where a special game pack is opened, high-rarity cards always appear.

Furthermore, similarly to the first draw table described above, the first-draw-table storage unit 182 stores a plurality of second draw tables corresponding to individual attributes. Furthermore, before the draw by the second draw unit 112, the player is allowed to select an attribute of cards to be used. Then, the second draw unit 112 performs a second draw by using a second draw table corresponding to this attribute selected by the player (i.e., a table that has been set such that only special cards having the attribute selected by the player are drawn).

This allows the player to use high-rarity cards having an attribute according to the play style or the like of the player, thereby improving a game playability.

Note that, as described above, in the case where there are cards that are available regardless of an attribute selected by the player, in each of the plurality of second draw tables corresponding to individual attributes, in addition to cards corresponding to an attribute, cards that are available regardless of this attribute may be set to be drawn.

When special cards that are to appear from the special game pack are determined by the second draw, the second draw unit 112 reports the determined special cards to the card group creation unit 113, the management control unit 116, and the processing result reporting unit 117.

Note that rarity in this embodiment may be indicated by only two degrees, namely, "high" and "low", or there may be more degrees. In the following description, as an example, the case where four degrees of rarity are set, namely, first rarity, second rarity, third rarity, and fourth rarity in the order of higher rarity, is assumed. In this case, in the first draw table, the winning probability of ordinary cards having the first rarity is set to be the lowest, and the winning probability of ordinary cards having the fourth rarity is set to be the highest.

Furthermore, in the second draw table, the winning probability of special cards having the second rarity is set to be higher than the winning probability of special cards having the first rarity, and the winning probability of special cards having the third rarity and special cards having the fourth rarity are set to be zero.

Note that, as a method for setting the winning probability to zero, for example, the value of the winning probability of special cards having the third rarity and special cards having the fourth rarity may be set to zero, or the second draw table may originally be configured not to include special cards having the third rarity and special cards having the fourth rarity as cards to be drawn.

The card group creation unit 113 creates a card group on the basis of the reports from the first draw unit 111 and the second draw unit 112. This card group is a card group that includes all ordinary cards determined, by the first draw unit 111 in the first draw, to appear from an ordinary game pack, and all special cards determined, by the second draw unit 112 in the second draw, to appear from a special game pack. The card group creation unit 113 reports the created card group to the deck construction unit 114 and the processing result reporting unit 117.

The deck construction unit 114 constructs a card deck by selecting cards from the card group created by the card group creation unit 113. This selection is performed on the basis of a card selection operation by the player. Here, although the number of cards can be arbitrarily determined in accordance with the content of a battle game, as an example, eight cards appear from each of an ordinary card pack and a special card pack. Furthermore, the card deck is constructed with the number of cards selected by the player within the range of 30 to 48 cards. The deck construction unit 114 reports the constructed card deck to the battle control unit 115, the management control unit 116, and the processing result reporting unit 117.

The battle control unit 115 controls the execution of processing for running a battle game played by using the card deck constructed by the deck construction unit 114 on the basis of the selection by the player. The battle game is played on the basis of a predetermined rule determined in advance. Note that the specific content of the battle game is not particularly limited, and the battle game may be an arbitrary battle game that is played by using a card deck.

Furthermore, in the case where processing involving changes in predetermined parameters (e.g., processing involving increases or decreases in the values of the parameters, or processing involving changes in flags indicating the states of the parameters) occurs in the battle game, the battle control unit 115 updates the predetermined parameters stored in the terminal-management-data storage unit 181. Furthermore, in this case, the battle control unit 115 informs the management control unit 116 and the processing result reporting unit 117 that the predetermined parameters have changed.

The management control unit 116 manages associations between a player ID and card IDs, the associations being information indicating the card owning state of the player (i.e., information indicating whether or not cards have been given to the player).

For example, the management control unit 116 updates the terminal-management-data storage unit 181 such that the IDs of all ordinary cards determined, by the first draw unit 111 in the first draw, to appear from an ordinary game pack are associated with the player ID. Then, these ordinary cards are managed as being in a state of being owned by the player (i.e., state of having been given to the player).

Furthermore, these associations between the ordinary card IDs and the player ID are reported to the processing result reporting unit 117. These associations between the ordinary card IDs and the player ID are performed regardless of winning or losing in the battle game.

Furthermore, in the case where a special card giving condition is satisfied on the basis of winning or losing in the battle game, the management control unit 116 determines to associate, with the player ID, the IDs of special cards that have been determined, by the second draw unit 112 in the second draw, to appear from a special game pack and that have been selected by the player, and on the basis of this determination, updates the associations stored in the terminal-management-data storage unit 181. Then, these special cards are managed as being in a state of being owned by the player (i.e., state of having been given to the player). Furthermore, this determination is reported to the processing result reporting unit 117. The special card giving condition is, for example, winning the predetermined number of times or more in the battle game. This giving condition may be a single condition but may be a combination of a plurality of conditions. For example, the combination of a plurality of conditions may be such that one of the second rarity cards can be selected by winning four times, and one of the first rarity cards can be selected by winning five times. Furthermore, the number of special cards that can be selected by the player may always be a predetermined number (e.g., one), or the number may differ in accordance with a satisfied condition. Alternatively, all of the special cards may be given to the player in accordance with a condition.

Note that the creator of the battle game, etc. can set, as appropriate, the special card giving condition and the winning probability of each draw table described above in consideration of the game balance, etc.

Furthermore, the management control unit 116 manages cards that can be used by the player in a sealed battle. For example, the management control unit 116 manages cards determined to appear from each card pack on the basis of the draw result of the first draw unit 111 or the second draw unit 112 as the cards that can be used by the player in a sealed battle. Furthermore, the management control unit 116 also manages cards included in the card deck constructed by the deck construction unit 114. This management can be performed by means of associations between a player ID and card IDs, similarly to the card owning state of the player.

For example, the management can be performed by: associating the player ID and the card IDs by adding, as supplementary information, the state in which the cards can be used by the player in a sealed battle instead of the card owning state; and updating the associations stored in the terminal-management-data storage unit 181. Furthermore, cards that can be used by the player in a sealed battle are discarded when the sealed battle is ended or a new sealed battle is started, and are brought into a state in which the cards cannot be used by the player in a sealed battle. In this case, by deleting the supplementary information, the management control unit 116 can manage the fact the cards have been brought into the state in which the cards cannot be used by the player in a sealed battle.

The processing result reporting unit 117 reports the processing results reported from the above-described individual functional blocks in the server 1b to the game-running execution unit 211 of the player terminal 2.

The game-running execution unit 211 continues to run the game (sealed battle here, as described above) on the basis of the reports from the processing result reporting unit 117. Specifically, on the basis of the reported individual processing results, the game-running execution unit 211 generates images and sounds corresponding to the progress of the game, and outputs the generated images and sounds from the output unit 27.

As described above, in this embodiment, running of the game can be realized by the cooperation between the player terminal 2 and the server 1a. Furthermore, in this embodiment, since at least part of processing concerning the game is performed at the server, it is possible to reduce processing at the player terminal 2. Furthermore, in this embodiment, it is possible to prevent tampering, etc. in the processing concerning the game at the player terminal 2.

The terminal-management-data storage unit 181 stores management data concerning the player terminal 2. The management data concerning the player terminal 2 refers to predetermined parameters in the games run by the game-running execution unit 211, as described earlier in the description of the game-running execution unit 211. For example, a parameter indicating which cards are owned by a player, various kinds of parameters for cards, characters, or the like owned by the player, a parameter indicating past game results in battle games, such as winning or losing, a parameter corresponding to the amount of an in-game currency owned in the games, and the like are stored as the management data. Note that, since a plurality of player terminals 2 are connected to the server 1a, the management data are managed for each player terminal 2 or for each player on the basis of identification information of the player terminal 2, identification information of the player, or the like.

The first-draw-table storage unit 182 stores the first draw table described above in the description of the first draw unit 111. Furthermore, the second-draw-table storage unit 183 stores the second draw table described above in the description of the second draw unit 112.

[Operations]

Figure 5:
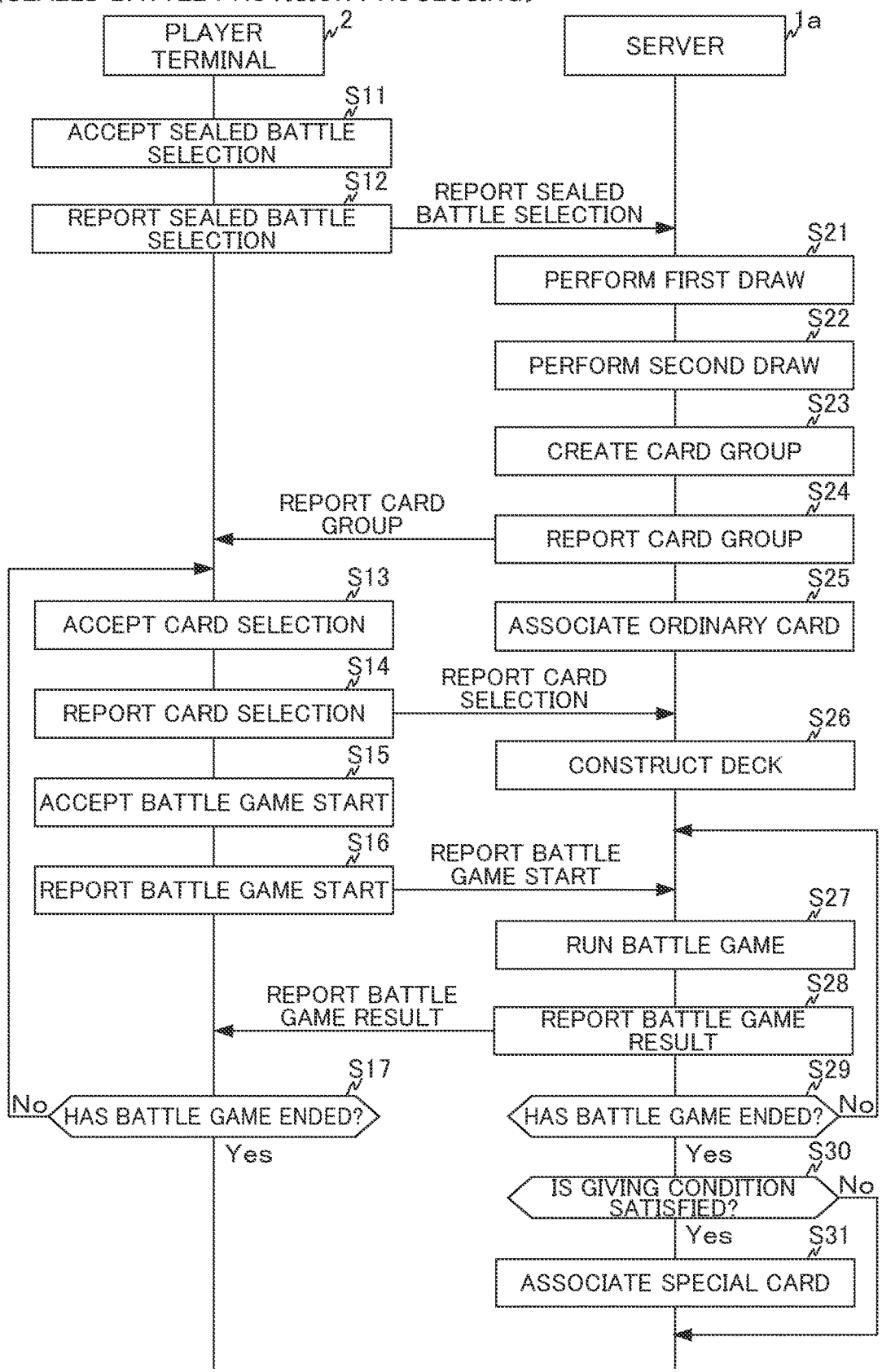
FIG. 5 is a sequence diagram for explaining the flow of the sealed battle provision processing executed by the server and the player terminal in FIG. 3 having the functional configurations in FIG. 4.
Figure 6:
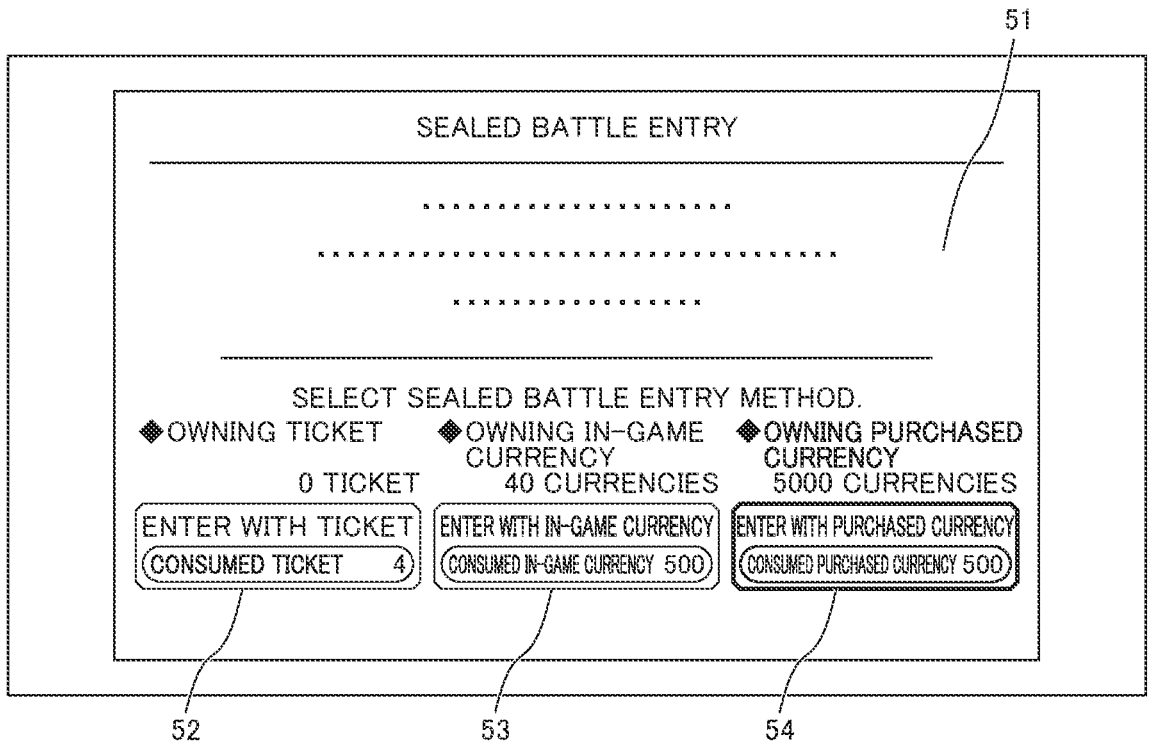
FIG. 6 is a schematic illustration showing a display example displayed when a sealed battle is selected in the sealed battle provision processing.

The functional blocks of the player terminal 2 and the server 1a have been described above. Next, operations in the sealed battle provision processing executed by the player terminal 2 and the server 1a will be described with reference to FIGS. 5 to 13. Here, FIG. 5 is a sequence diagram for explaining the flow of the sealed battle provision processing. Furthermore, FIGS. 6 to 13 are schematic illustrations showing display examples displayed on a display connected to the output unit 27 in the sealed battle provision processing, by means of control by the game-running execution unit 211.

For example, the sealed battle provision processing is executed in the case where a player has performed a selection operation for selecting a sealed battle as a game to play. Note that, although not specifically mentioned in the following description of the sealed battle provision processing, as a prerequisite for the sealed battle provision processing, each functional block of the player terminal 2 or each functional block of the server 1a executes, as appropriate and as needed, computational processing or communication required for running a sealed battle.

In step S11, the player operation reporting unit 212 accepts, from the player, the selection operation for selecting a sealed battle as a game to play.

For example, this selection operation is accepted via a user interface as in the display examples shown in FIGS. 6 to 9. First, in the display example shown in FIG. 6, text describing the outline of the sealed battle is displayed in the area indicated as a display 51. For example, the display indicates that an ordinary card pack and a special card pack are used in the sealed battle. Furthermore, for example, the display indicates that all ordinary cards are given but special cards are given only in the case where the player wins the battle game. Furthermore, rarity rates of the cards obtained in the sealed battle may also be displayed.

Furthermore, in order to select a price for playing the sealed battle, as indicated as a display 52, a display 53, and a display 54, buttons for selecting a kind of price and required price are displayed. The player performs a selection operation by means of an operation of pressing one of the buttons for selecting a kind of price. Note that the price is, for example, tickets or an in-game currency that can be obtained in accordance with the progress of a game, the occurrence of an event, or the like, or a purchased currency.

Figure 7:
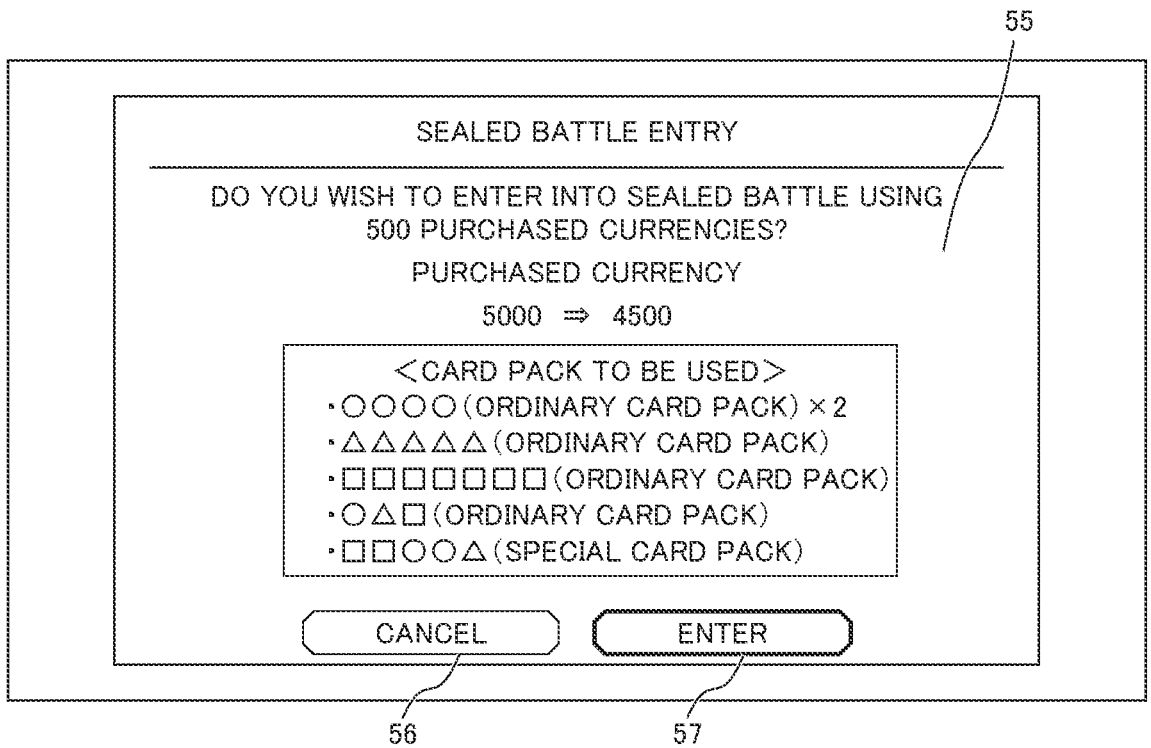
FIG. 7 is a schematic illustration showing another display example displayed when a sealed battle is selected in the sealed battle provision processing.

For example, in the case where the player presses the display 54, the display shifts to the display example shown in FIG. 7. In the display example shown in FIG. 7, the amount of purchased currency required for playing the sealed battle and a list of card packs to be used to play the sealed battle are displayed in the area indicated as a display 55. Here, the list of card packs include ordinary card packs and a special card pack. Furthermore, as indicated as a display 56, a button for returning to the display example in FIG. 6 to select another price is displayed. Furthermore, as indicated as a display 57, a button for starting the sealed battle is displayed. By pressing the button of the display 57, the player can perform a price selection operation for selecting the sealed battle as a game to play.

Figure 8:
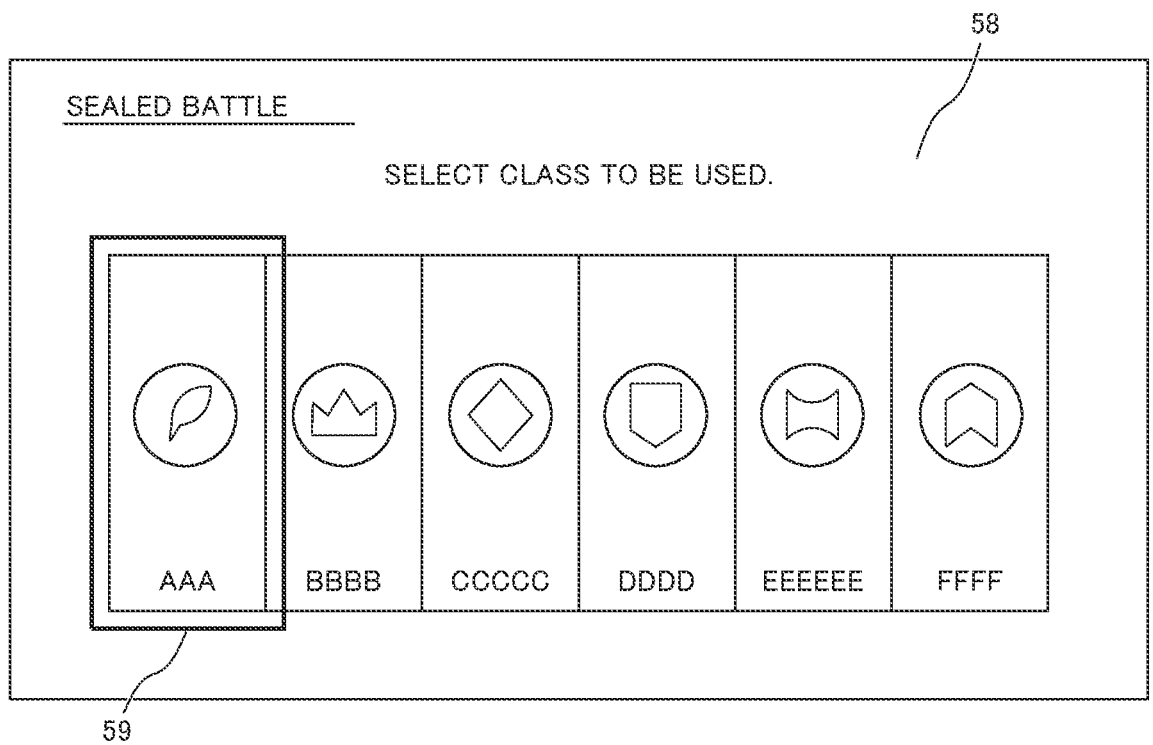
FIG. 8 is a schematic illustration showing another display example displayed when a sealed battle is selected in the sealed battle provision processing.

In the case where the player presses the display 57, the display shifts to the display example shown in FIG. 8. In the display example shown in FIG. 8, a plurality of attributes to be selected are displayed in the area indicated as a display 58. The player can select an arbitrary attribute by moving a selection cursor displayed as a display 59 to an attribute to be selected and pressing the attribute.

Figure 9:
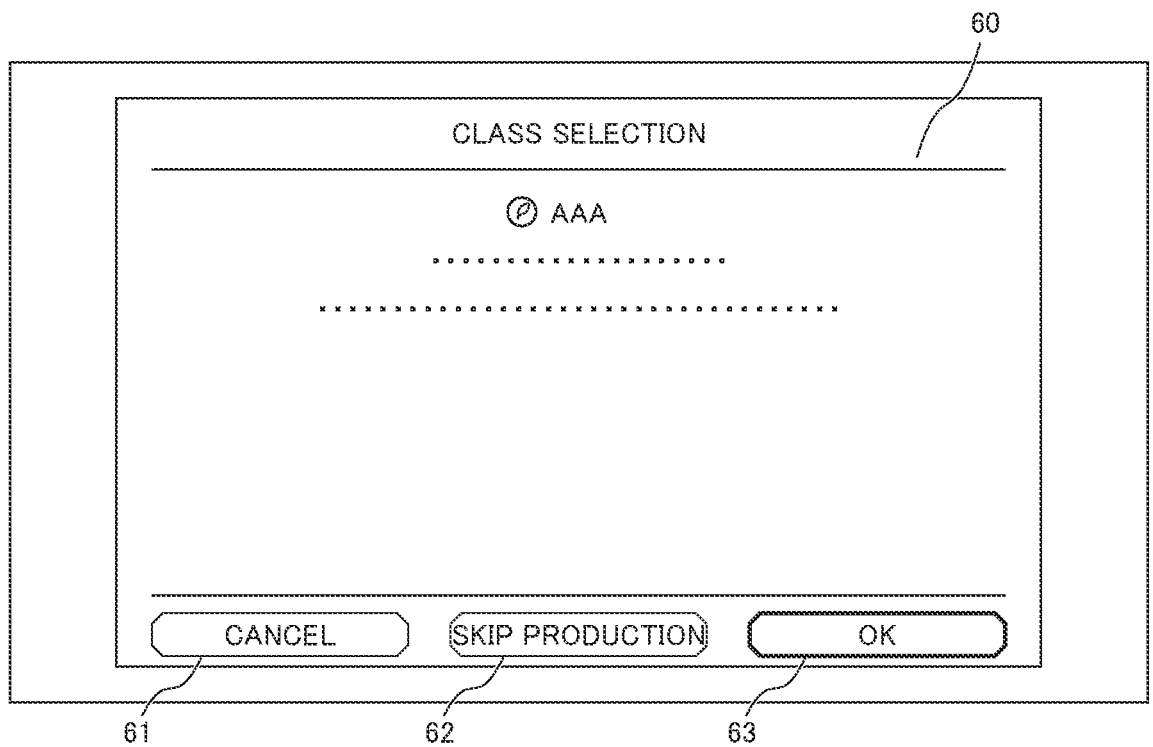
FIG. 9 is a schematic illustration showing another display example displayed when a sealed battle is selected in the sealed battle provision processing.
Figure 10:
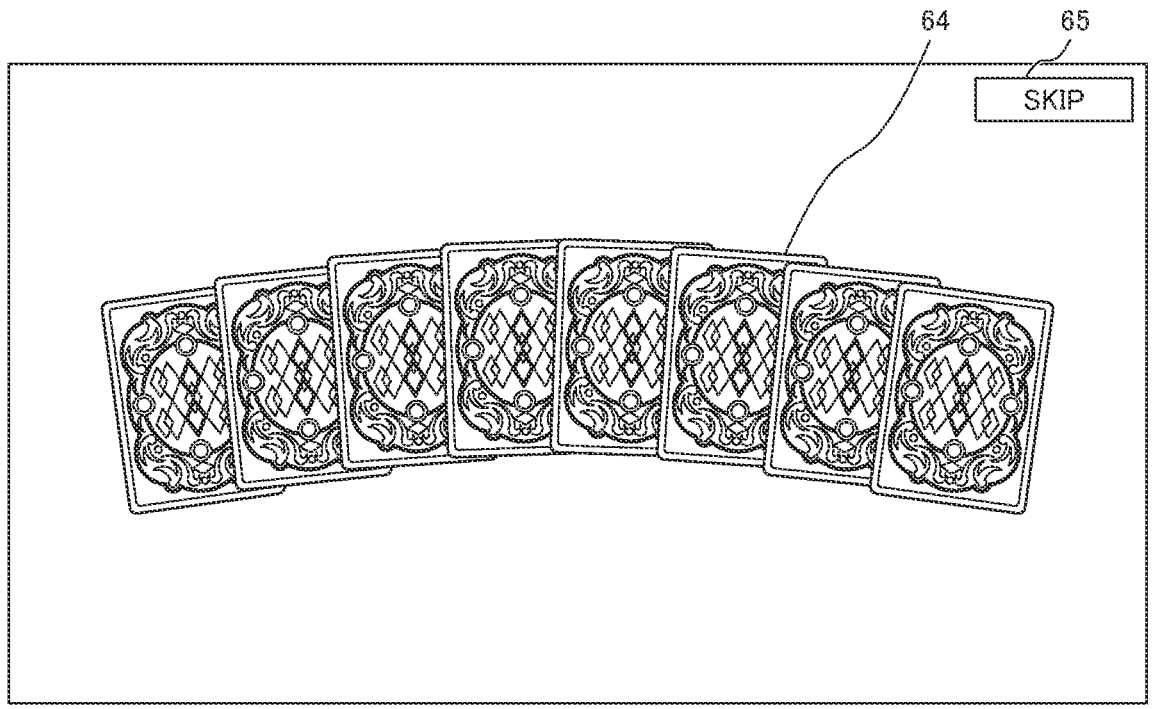
FIG. 10 is a schematic illustration showing a display example displayed when a production of opening a card pack is performed in the sealed battle provision processing.
Figure 11:
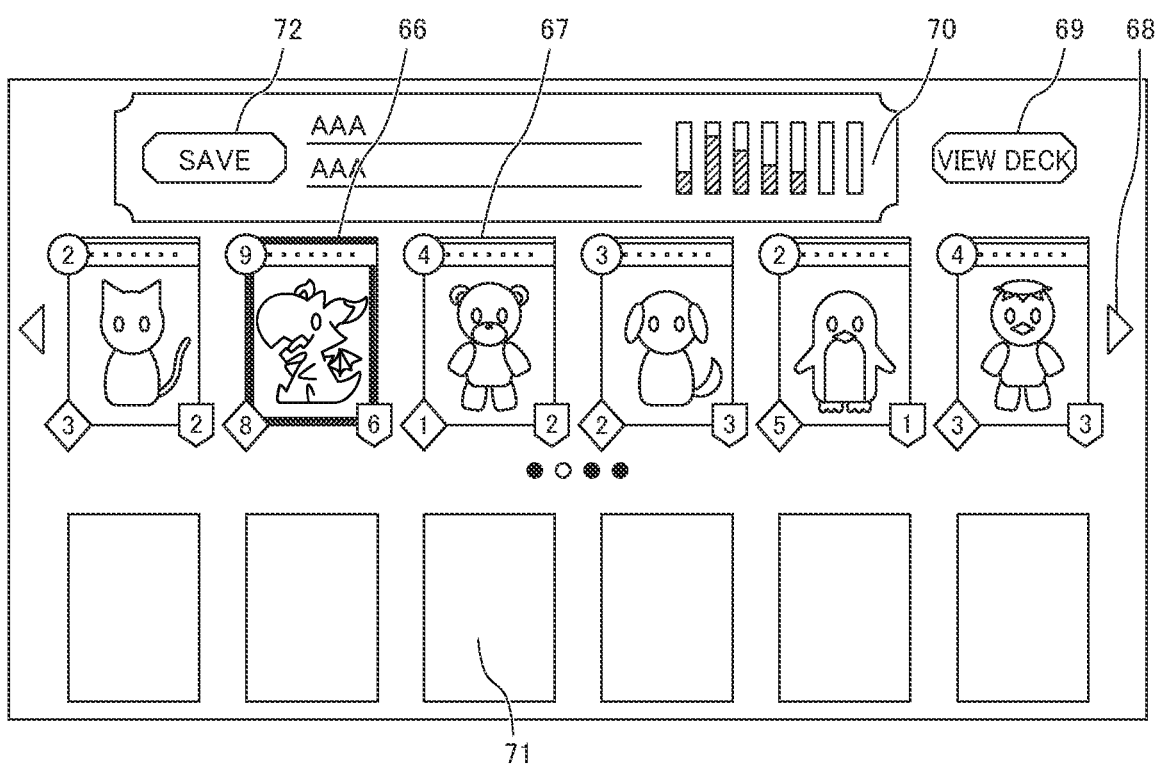
FIG. 11 is a schematic illustration showing a display example displayed when a card deck is constructed in the sealed battle provision processing.
Figure 12:
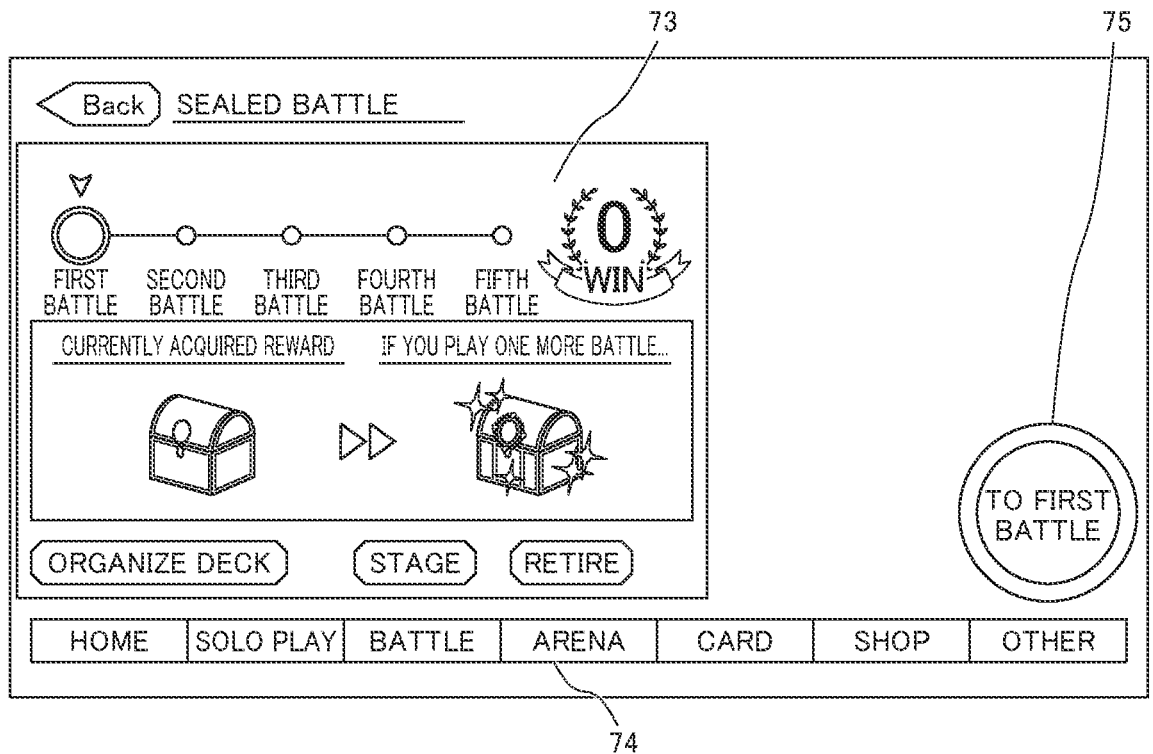
FIG. 12 is a schematic illustration showing a display example displayed when a battle game start operation is performed in the sealed battle provision processing.
Figure 13:
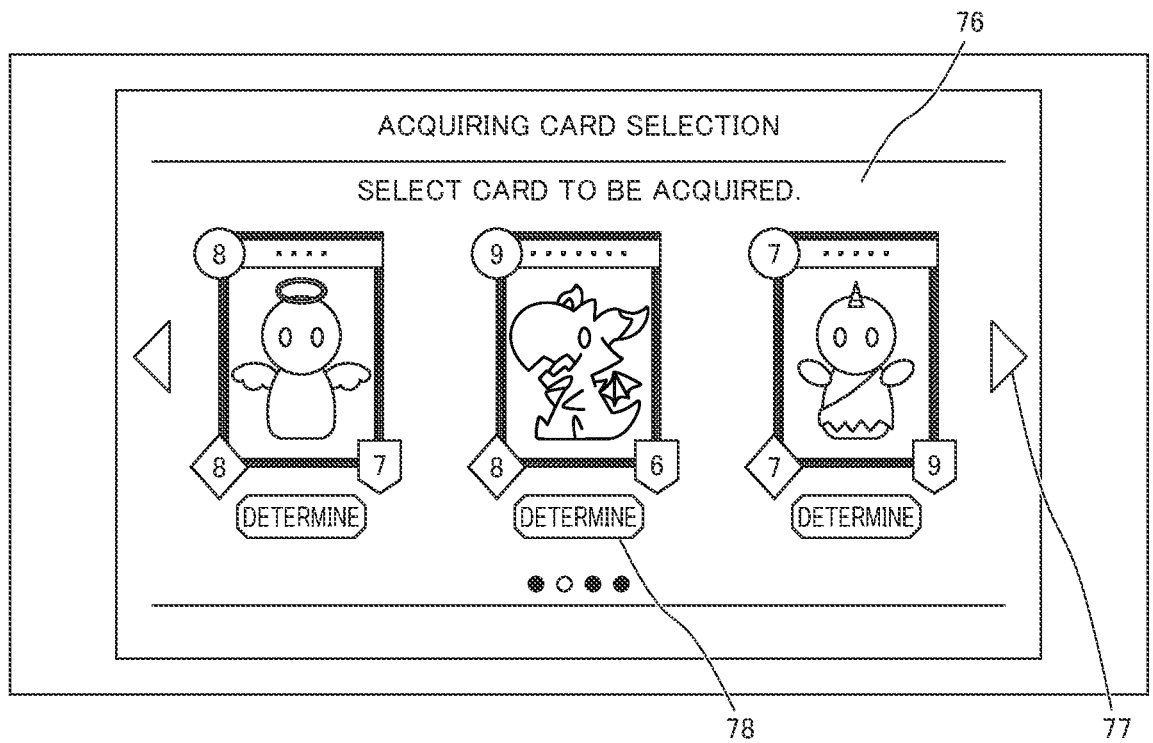
FIG. 13 is a schematic illustration showing a display example displayed when a special card is selected in the sealed battle provision processing.

In the case where the player presses the display 59, the display shifts to the display example shown in FIG. 9. In the display example shown in FIG. 9, text indicating that only cards having the attribute selected by the player and cards that can be used regardless of the attribute selected by the player can be obtained is displayed in the area indicated as a display 60. Furthermore, as indicated as a display 61, a button for returning to the display example in FIG. 8 to select another attribute is displayed. Furthermore, as indicated as a display 62, a button for skipping production (i.e., omitting the production) during a draw in the sealed battle is displayed. Furthermore, as indicated as a display 63, a button for performing a selection operation for selecting a sealed battle as a game to play is displayed. The acceptance in step S11 is terminated by the player pressing the button displayed as the display 63.

Referring back to FIG. 5, in step S12, the player operation reporting unit 212 transmits the content of the accepted player operations (i.e., the content that a sealed battle is selected as a game to play, the price selected by the player, and the attribute selected by the player) to the server 1a to report the content of the player selections to the server 1a.

In step S21, the first draw unit 111 performs a first draw when triggered by a situation where the content of the player operation has been reported in step S12. By doing so, ordinary cards that are to appear from the ordinary card pack are determined.

In step S22, the second draw unit 112 performs a second draw when triggered by a situation where the content of the player operation has been reported in step S12. By doing so, special cards that are to appear from the special card pack are determined.

Note that one of step S21 and step S22 may be executed first, or both of them may be executed at the same time in parallel.

In step S23, the card group creation unit 113 creates a card group on the basis of the draw results of step S21 and step S22.

In step S24, the card group creation unit 113 reports the card group created in step S23 to the player terminal 2. When the report is performed in step S24, in the area of a display 64 in the display example shown in FIG. 10, a production in which cards determined to appear from each card pack are displayed to the player is performed. By seeing such a production, the player can have a sense of presence like the case where the player actually opens a card pack in an analog card game. By the end of the production, all cards included in the card group reported in step S24 are displayed in a list. Furthermore, as indicated as a display 65, a button for skipping (omitting) the production during a draw is displayed.

Referring back to FIG. 4, in step S25, the management control unit 116 associates, with a player ID, the individual IDs of the ordinary cards determined to appear from the ordinary card pack in the draw in step S21.

In step S13, the player operation reporting unit 212 accepts, from the player, a card selection operation for constructing a card deck. For example, this selection operation is accepted via a user interface as in the display example shown in FIG. 11. In the display example shown in FIG. 11, cards currently included in a card deck are displayed at the center of the screen. In an initial state, all cards included in the card group reported in step S24 are displayed as being included in the card deck. Each card is displayed with a card name, the design of a character corresponding to the card, a numeric value indicating the performance of the card, and a numeric value indicating the rarity of the card. Note that this is merely an example of a card display, and, for example, the rarity of the card may be indicated by the color of a part (e.g., an edge part or a background part) of the card, etc.

Furthermore, in the card display, ordinary cards and special cards are displayed in different display modes such that the player can discriminate the ordinary cards and the special cards from each other. For example, the card displayed as a display 66 is a special card and the hue of the edge part of the card (represented by hatching in the figure) is displayed differently from the ordinary card displayed as a display 67 and other ordinary cards shown in the figure. By viewing this display, the player can identify which cards are special cards and which cards are ordinary cards.

This enables the player to use a special card with a motivation such as "I will try a special card that I have never owned before". This makes it possible to make the player more interested in a sealed battle.

Note that varying the hue of the edge part of a card is merely an example of varying a display mode, and, for example, the display mode may be varied by using a method such as displaying the card with an effect such as blinking, or additionally displaying text indicating whether the card is an ordinary card or a special card. Furthermore, in the battle game to be played subsequently, since the card performance of the same card does not vary depending on whether the card is an ordinary card or a special card, the display mode may be configured so as not to be varied during the battle game.

The player can view all cards included in the card deck by pressing a slide button for displaying cards, displayed as a display 68, or pressing a button displayed as display 69. Furthermore, by selecting a displayed card, the player can display a deck name or a bar graph indicating a deck configuration in an area displayed in the upper part of the screen as a display 70.

Furthermore, the player can remove a card determined to be unnecessary for the card deck by performing an operation for moving the card to an area displayed in the lower part of the screen as a display 71. Alternatively, the player can return the card removed from the card deck to the card deck by performing an operation opposite to said operation.

When the construction of the card deck is eventually completed, the player can save the constructed card deck by pressing a button displayed as a display 72. The acceptance in step S13 is ended by the player pressing this button.

Referring back to FIG. 5, in step S14, the player operation reporting unit 212 reports the cards selected for constructing a card deck in step S13 to the server 1*a*.

In step S26, the deck construction unit 114 constructs a card deck on the basis of the report in step S13.

In step S15, the player operation reporting unit 212 accepts, from the player, a start operation for starting a battle game. For example, this start operation is accepted via a user interface as in the display example shown in FIG. 12. In the display example shown in FIG. 12, a winning or losing state in the battle game, and information related to a reward that can be acquired in the case where the player wins the battle game at the present time is displayed in the area indicated as a display 73. Furthermore, a button for shifting to the user interface shown in FIG. 11 in order to reorganize the card deck, a button for viewing the content of a specific reward, and a button for ending the battle game are displayed. Note that, as an example for description, this embodiment assumes that a battle is played five times in the battle game. Furthermore, in the case where the battle game is ended before a battle is played five times, a reward that can be acquired is determined on the basis of the game result of the battle game at that time.

Furthermore, as indicated as a display 74, buttons for playing games of forms other than a battle game in the sealed battle, etc. are displayed. In the games of forms other than the battle game in the sealed battle, the player can use ordinary cards given to the player in the sealed battle. Meanwhile, since the sealed battle has not ended yet, special cards have not been given to the player yet at this time. Thus, in the games of forms other than the battle game, the player cannot use special cards.

Note that the given ordinary cards are in a state of being owned by the player, the player can arbitrarily sell, etc. these cards. In the case where such selling, etc. of ordinary cards by the player occurs, the management control unit 116 updates supplementary information of associations, stored in the terminal-management-data storage unit 181, between the player ID and the card IDs of the ordinary cards that have been sold, etc., thereby providing a state in which the player does not own these ordinary cards and a state in which the player can use these ordinary cards in the sealed battle. By doing so, since the ordinary cards that have been sold, etc. are not owned by the player any more (i.e., the state of being given to the player has been released), the player cannot use these ordinary cards any more in games of forms other than the battle game in the sealed battle, but the player can still use these ordinary cards in the battle game in the sealed battle. Furthermore, as indicated as a display 75, a button for starting a battle game is displayed. The acceptance in step S15 is ended by the player pressing this button.

Referring back to FIG. 5, in step S16, the player operation reporting unit 212 reports the accepted battle game start report to the server 1*a*.

In step S27, the battle control unit 115 runs a battle game using the card deck constructed in step S13. In the battle game, for example, various kinds of information obtained as the battle game proceeds, such as increased or decreased parameter values (e.g., hit point values decreased due to an attack) are transmitted and received between the server 1*a* and the player terminal. However, since the transmission and reception of these kinds of information are well known to a person skilled in the art, illustrations and detailed descriptions of these operations are omitted here.

In step S28, the processing result reporting unit 117 reports the result of the battle game played in step S27 (i.e., winning or losing in the battle game) to the player terminal 2.

In step S17, the game-running execution unit 211 determines whether or not the battle game has ended.

As described above, this embodiment assumes that a battle is played five times in the battle game. Thus, the game-running execution unit 211 determines whether or not a battle has been played five times. In the case where a battle has been played five times, the determination in step S17 results in Yes, and this processing is terminated. Meanwhile, in the case where a battle has not been played five times yet, the determination in step S17 results in No, the processing returns to step S13, and the above-described processing steps are repeated.

Note that the processing may return to step S15, not step S13. Furthermore, in the case where the player wishes to reconstruct a card deck, it is possible to cause the processing to return to step S13 by pressing a button for reorganizing a deck in the user interface shown in FIG. 12.

In step S29, similarly to step S17, the processing result reporting unit 117 determines whether or not the battle game is ended. Then, in the case where a battle has been played five times, the determination in step S29 results in Yes, and the processing proceeds to step S30. Meanwhile, in the case where a battle has not been played five times yet, the determination in step S29 results in No, the processing returns to step S27, and the above-described processing steps are repeated.

Note that, also in the case where an operation for ending the battle game has been accepted from the player, the determinations in step S17 and step S29 result in Yes.

In step S30, the management control unit 116 determines whether or not a special card giving condition is satisfied. As in the above description about the management control unit 116, the special card giving condition is, for example, winning the predetermined number of times or more in the battle game. In the case where the player has won the predetermined number of times or more in the battle game, the determination in step S30 results in Yes, and the processing proceeds to step S31. Meanwhile, in the case where the player has not won the predetermined number of times or more in the battle game, the determination in step S30 results in No, and this processing is terminated. In this case, a reward other than special cards is given to the player on the basis of the game result of the battle game.

In step S31, the management control unit 116 associates a player ID with the card IDs of special cards to be given to the player. This completes giving the special cards to the player. Here, although all of the special cards may be given as in the above description about the management control unit 116, only a predetermined number of cards (e.g., one card) may be given. In the case where only a predetermined number of cards are given like this, the player performs a selection operation for selecting special cards to be given to the player. For example, this selection operation is accepted via a user interface as in the display example shown in FIG. 13. In the display example shown in FIG. 13, all of the special cards determined to appear from the special card pack in the draw in step S22 are displayed in the area indicated as a display 76. The player can view all of the special cards by pressing a slide button for displaying cards, displayed as a display 77. The acceptance of the selection of special cards to be given is ended by the player selecting desired special cards and pressing the button displayed as a display 78. In this case, the management control unit 116 associates a player ID with the card IDs of the selected special cards. This completes giving the special cards to the player. Then, this processing is terminated.

The sealed battle provision processing is executed through the above-described cooperation between the player terminal 2 and the server 1a. With this processing, since it is possible to realize a sealed battle using a plurality of kinds of card pack, namely, an ordinary card pack and a special card pack, it is possible to appropriately give game media (cards in this case) to a player without lowering a game playability.

Furthermore, with this processing, it is possible to provide a variety of effects as described in the overview in [The Overview of this embodiment] above.

Although the embodiment of the present invention has been described above, the embodiment is merely an example and does not limit the technical scope of the present invention.

The present invention can be embodied in various other forms, and it is possible to make various modifications, such as omission and substitution, without departing from the spirit of the present invention. These embodiments and modifications thereof are encompassed in the scope and spirit of the invention described in this description, etc. and are encompassed in the scope of the invention recited in the claims and equivalents thereof.

For example, the embodiment of the present invention may be modified as in the following modifications. Note that, in the descriptions of the following modifications, repeated descriptions of commonalities with the above-described embodiment will be omitted, and what is specific to each modification will be described in detail.

<First Modification>

In the above-described embodiment, a game creator creates a second draw table before starting the sealed battle provision processing. Then, the second draw unit 112 performs a second draw on the basis of this second draw table. Without limitation thereto, the server 1b may create the second draw table automatically. This modification for automatically creating this second draw table will be described with reference to FIG. 14. Note that, as described above, since this modification and the above-described embodiment have the same hardware configuration, but have partly different functional configurations, the server 1 will be referred to as the server 1b in this modification for distinction.

[Functional Configuration]

The functional configuration of the server 1b will be described with reference to FIG. 14.

Figure 14:
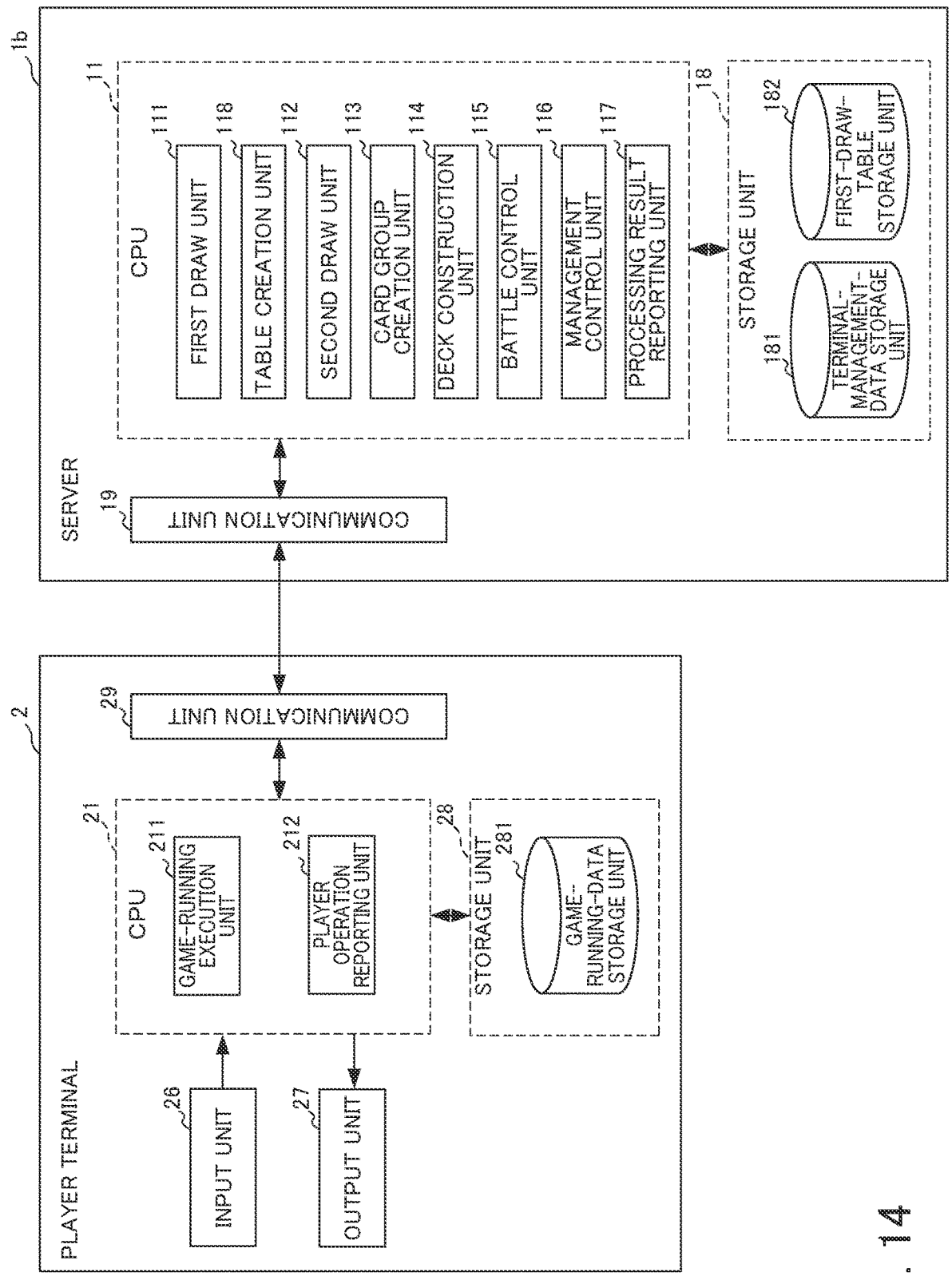
FIG. 14 is a functional block diagram showing, of the functional configurations of the server and the player terminal in a modification of the embodiment of the present invention, a functional configuration for executing the sealed battle provision processing.

FIG. 14 is a functional block diagram showing, of the functional configuration of the server 1b, a functional configuration for executing the sealed battle provision processing.

In the server 1b, a table creation unit 118 further functions, as opposed to the server 1a. Furthermore, in the server 1b, it is not necessary to set a second-draw-table storage unit in one area of the storage unit 28, as opposed to the server 1a.

The table creation unit 118 creates the second draw table by extracting information corresponding to cards having predetermined rarity from a first draw table. As described above, in the first draw table, although the winning probability of high rarity ordinary cards is set to be lower than the winning probability of low rarity ordinary cards, the information and winning probability of the high rarity ordinary cards are included in the table.

Thus, the table creation unit 118 extracts the information and winning probability of these high rarity ordinary cards from the first draw table. Then, the table creation unit 118 sets the information of the extracted high rarity ordinary cards as information of high rarity special cards in the second draw table. Furthermore, on the basis of the ratio of the extracted winning probability of the individual extracted high rarity ordinary cards, the table creation unit 118 calculates the winning probability of the individual high rarity special cards in the second draw table as percentages.

By doing so, the table creation unit 118 can create the second draw table including the information of high rarity special cards and the winning probabilities of the individual special cards represented by percentages.

The table creation unit 118 reports the created second draw table to the second draw unit 112. Then, the second draw unit 112 performs a second draw on the basis of this second draw table. This makes it possible to automatically create the second draw table and perform the second draw by means of this automatically-created second draw table. That is, it is possible to perform sealed battle provision processing similar to that in the above-described embodiment.

Note that the table creation unit 118 can create the second draw table at an arbitrary timing before performing the second draw.

According to this modification, a game creator does not need to prepare a second draw table for a special card pack in a sealed battle. Thus, it is possible to reduce the labor of the game creator for creating a game.

Furthermore, according to this modification, it is possible to use an existing first draw table created for an ordinary card pack that is to be used in games other than the sealed battle. Thus, in the case where an update, such as adding a new card or changing a winning probability, is made on the first draw table, it is possible to immediately create a second draw table on which this update of the first draw table has been reflected. Note that, while such an update of the first draw table does not occur, the second draw table created once by the table creation unit 118 may be stored in the storage unit 18, and this second draw table may be used. This makes it unnecessary to create a second draw table every time a sealed battle is played.

<Second Modification>

In the above-described embodiment, the first-draw-table storage unit 182 stores a plurality of first draw tables and second draw tables corresponding to individual card attributes. Without limitation thereto, the server 1a or the server $1b$ may automatically create a first draw table or a second draw table corresponding to each card attribute. In this case, the server $1a$ is provided with the table creation unit 118 as in the above-described first modification. Furthermore, the server $1b$ has a functional configuration similar to that in the above-described first modification. Furthermore, the first draw table or the second draw table is not provided for each attribute, but is created as a single table.

Furthermore, in the case where a player selects an attribute, the table creation unit 118 extracts, from each draw table, the information and winning probabilities of cards corresponding to the attribute selected by the player. Then, the table creation unit 118 sets the information of the extracted cards as information of cards in a newly created table. Furthermore, on the basis of the ratio of the extracted winning probabilities of the individual extracted cards, the table creation unit 118 calculates the winning probabilities of the individual cards in the newly created table as percentages.

By doing so, the table creation unit 118 can create the first draw table and the second draw table that include the information of cards corresponding to the attribute selected by the player and the winning probabilities of the individual cards represented by percentages. Note that, in the case where this modification is combined with the above-described first modification, a second draw table is further created from the thus-created first draw table corresponding to the attribute selected by the player. This makes it possible to also create a second draw table corresponding to the attribute selected by the player.

Then, the first draw unit 111 and the second draw unit 112 perform draws on the basis of this created table. This makes it possible to automatically create a table corresponding to the attribute selected by the player, and perform a draw by means of this automatically-created table. That is, it is possible to perform sealed battle provision processing similar to that in the above-described embodiment.

This makes it unnecessary to prepare a plurality of first draw tables or second draw tables corresponding to individual card attributes. This makes it possible to reduce the total amount of information related to cards that can be used regardless of attributes, said information having been included in the individual first draw tables or second draw tables corresponding to the individual card attributes, and thus having been duplicate information as a whole.

<Third Modification>

In the above-described embodiment, "cards" are used as game media, and a card deck is generated from these cards. Without limitation thereto, things other than cards may be used as game media to generate a deck. For example, other objects such as "characters" or "items" owned by a player may be used as game media to generate a deck. In this case, similarly to cards, attributes may also be given to "characters", "items", etc.

That is, the above-described embodiment and modifications can be applied not only to digital card games, but also widely to other games.

<Fourth Modification>

In the above-described embodiment, all ordinary cards determined, by a first draw, to appear from an ordinary game pack are given to a player. Without limitation thereto, at least some, but not all, of the ordinary cards determined, by the first draw, to appear from the ordinary game pack may be given to the player.

In this case, similarly to the special card giving condition, an ordinary card giving condition is defined in advance. Furthermore, on the basis of the ordinary card giving condition, the management control unit 116 determines that at least some, not all, of the ordinary cards determined, by the first draw, to appear from the ordinary game pack are given to the player. Furthermore, on the basis of this determination, the management control unit 116 updates the terminal-management-data storage unit 181 such that the IDs of the ordinary cards are associated with a player ID. Then, these ordinary cards are managed as being in a state of being owned by the player (i.e., state of having been given to the player).

As the ordinary card giving condition, for example, the number of ordinary cards to be given to the player is defined for each ordinary card pack, and it is determined that these predetermined number of cards are given to the player. In this case, the ordinary cards to be given may be determined on the basis of a player selection, or may be determined randomly. Similarly to the above-described special card giving condition, this ordinary card giving condition can be set, as appropriate, by the creator of a battle game, etc. considering game balance, etc. This makes it possible to provide more options for the creator of the battle game, etc. to adjust game balance, etc.

<Fifth Modification>

In the above-described embodiment, cards that can be used by a player in a sealed battle are managed by associating a player ID with card IDs, and adding, as supplementary information, information that the cards are in a state in which the cards can be used by the player in a sealed battle. That is, by adding supplementary information (e.g., a flag) to one association between a player ID and a card ID, a state in which the card can be used by the player in a sealed battle, and a state in which the card is owned by the player (i.e., state in which the card has been given to the player) are managed.

Without limitation thereto, management may be performed in other methods. For example, the state in which the card can be used by the player in a sealed battle, and the state in which the card is owned by the player may be managed separately.

In this case, data for managing whether or not the card can be used by the player in a sealed battle (hereinafter referred to as "first management data") is prepared in the terminal-management-data storage unit 181 for each player. Furthermore, data for managing whether or not the card is owned by the player and the card can be used by the player in games other than the sealed battle (hereinafter referred to as "second management data") is prepared in the terminal-management-data storage unit 181 for each player, separately from the first management data.

Furthermore, on the basis of the draw result of the first draw unit 111 or the second draw unit 112, the management control unit 116 registers, in the first management data, the card IDs of cards determined to appear from each card pack as cards that can be used by the player in a sealed battle.

Furthermore, the card IDs of cards to be discarded due to the end of a sealed battle or the start of a new sealed battle are deleted from the first management data.

Meanwhile, on the basis of the draw result of the first draw unit 111, the management control unit 116 registers, in the second management data, the card IDs of ordinary cards determined to appear from an ordinary card pack, as cards that are owned by the player and that can be used by the player in games other than a sealed battle.

Furthermore, in the case where a special card giving condition is satisfied on the basis of winning or losing in a battle game, the management control unit 116 registers, in the second management data, the IDs of special cards that have been determined, by the second draw unit 112 in the second draw, to appear from a special game pack and that have been selected by the player, as cards that are owned by the player and that can be used by the player in games other than a sealed battle.

By performing management like this, for example, in games other than a sealed battle, it is possible to grasp the card owning state of the player by merely referring to the second management data. That is, in games other than a sealed battle, it is possible to make it unnecessary to refer to the first management data, which is special data used in the sealed battle.

Note that, as described above with reference to FIG. 12, even before a sealed battle ends, the player can arbitrarily sell, etc. ordinary cards owned by the player. In this modification, in the case where such selling, etc. of ordinary cards by the player occurs, the management control unit 116 deletes the card IDs of the ordinary cards that have been sold, etc. from the second management data, and keeps the card IDs registered in the first management data. By doing so, since the ordinary cards that have been sold, etc. are not owned by the player any more (i.e., the state of being given to the player has been released), the player cannot use these ordinary cards any more in games of forms other than a battle game in a sealed battle, but the player can still use these ordinary cards in a battle game in a sealed battle.

<Sixth Modification>

In the above-described embodiment, in a sealed battle, two players play a battle game against each other by using card decks. Without limitation thereto, in a sealed battle, games of other forms using card decks may be played.

For example, as games of other forms, a game played by three or more players and in which the places of the players are determined may be played. This game may be a game in which places are determined by the individual players competing with each other until the end. Alternatively, this game may be a game of the form in which players are eliminated as they lose, or a game of the form in which players are eliminated as they make a predetermined error or the like. Furthermore, this game may be configured such that the places are determined from the bottom in order of elimination, and the player that have survived to the end wins the first place.

In this case, a special card giving condition is defined in advance with respect to the places. Then, special cards are given to the players on the basis of this special card giving condition and the places determined by the game.

As another example, a game of the form in which teams each including a plurality of players play a battle against each other may be played. Then, special cards may be given to the players included in the winning team on the basis of the special card giving condition.

The embodiment of the present invention and the modifications thereof have been described above. Note, however, that the present invention is not limited to the embodiment and modifications described above and that the present invention encompasses modifications, improvements, etc. within a scope in which it is possible to achieve the object of the present invention.

For example, although the above-described embodiment has been described in the context of an example where the server 1 or the player terminal 2 to which the present invention is applied is a server device, a game machine, or a smartphone, there is no particular limitation thereto. The present invention is applicable to electronic devices having information processing functions in general.

Furthermore, the series of processing steps described above can be executed by hardware or by software.

In other words, the functional configurations shown in FIG. 4 and FIG. 14 are merely an example, and there is no particular limitation thereto. That is, it suffices to provide the server 1 and the player terminal 2 with functions that make it possible to execute the series of processing steps described above as a whole, and the choice of specific functional blocks for realizing those functions is not limited to that in the examples in FIG. 4 and FIG. 14.

Furthermore, the functional configurations of the server 1 and the player terminal 2 may be realized by a single device. Alternatively, the functions of the server 1 may be distributed to a plurality of server devices and realized by the plurality of devices.

Furthermore, each functional block may be implemented by hardware alone, by software alone, or by a combination of hardware and software.

The functional configurations in the embodiment are realized by using a processor that executes computational processing. Processors that can be used in the embodiment include a processor constituted of only a processing device of various kinds, such as a single processor, a multiprocessor, or a multicore processor, as well as a combination of one of these various kinds of processing device and a processing circuit such as an ASIC (Application Specific Integrated Circuit) or an FPGA (Field-Programmable Gate Array).

In the case where the series of processing steps is executed by software, a program constituting the software is installed in a computer or the like from a network or a recording medium.

The computer may be a computer embedded in special hardware. Alternatively, the computer may be a computer that is capable of executing various kinds of functions when various kinds of programs are installed therein, such as a general-purpose personal computer.

A recording medium including such a program is implemented by the removable medium 100 in FIG. 3, which is distributed separately from the main unit of a device in order to provide a player with the program, or is implemented by a recording medium or the like that is provided to a player in a state embedded in advance in the main unit of a device. The removable medium 100 is implemented, for example, by a magnetic disk (including a floppy disk), an optical disk, or a magneto-optical disk. The optical disk is implemented, for example, by a CD-ROM (Compact Disk-Read Only Memory), a DVD (Digital Versatile Disk), or a Blu-ray (registered trademark) disc. The magneto-optical disk is implemented, for example, by an MD (Mini-Disk). Furthermore, the recording medium that is provided to a player in a state embedded in advance in the main unit of a device is implemented, for example, by the ROM 12 in FIG. 3 or the ROM 22 in FIG. 3, in which a program is recorded, or a semiconductor memory included in the storage unit 18 in FIG. 3 or the storage unit 28 in FIG. 3.

In this description, steps defining the program recorded in the recording medium may include processing that is not necessarily executed sequentially but is executed in parallel or individually, as well as processing that is executed sequentially in order. Furthermore, steps that are executed according to the program recorded in the recording medium may be executed in an arbitrary order within a scope not departing from the spirit of the present invention.

| Explanation Of Reference Numerals | |
|---|---|
| 1 | Server |
| 2 | Player terminal |
| 5 | Network |
| 11, 21 | CPU |
| 12, 22 | ROM |
| 13, 23 | RAM |
| 14, 24 | Bus |
| 15, 25 | Input/output interface |
| 16, 26 | Input unit |
| 17, 27 | Output unit |
| 18, 28 | Storage unit |
| 19, 29 | Communication unit |
| 20, 30 | Drive |
| 100 | Removable medium |
| 111 | First draw unit |
| 112 | Second draw unit |
| 113 | Card group creation unit |
| 114 | Deck construction unit |
| 115 | Battle control unit |
| 116 | Management control unit |
| 117 | Processing result reporting unit |
| 118 | Table creation unit |
| 181 | Terminal-management-data storage unit |
| 182 | First-draw-table storage unit |
| 183 | Second-draw-table storage unit |
| 211 | Game-running execution unit |
| 212 | Player operation reporting unit |
| 281 | Game-running-data storage unit |
| S | Information processing system |

The invention claimed is:

1. A non-transitory computer readable medium storing an information processing program, which when executed by at least one processor, causes the at least one processor to perform a method comprising:

receiving, from a first player terminal, a predetermined game selection for an electronic card game, wherein the predetermined game selection corresponds to a battle between a player associated with the first player terminal and a plurality of players associated with a plurality of player terminals communicating over a network;

receiving, from the first player terminal, a card selection of a first plurality of electronic cards, wherein the card selection is performed by a card selection operation in a graphical user interface on the first player terminal, and wherein the card selection is transmitted by the first player terminal over the network to a server;

determining first game media by performing a draw based on a first draw table based on the card selection of the first plurality of electronic cards;

determining second game media by performing a draw based on a second draw table based on the predetermined game selection by the player, wherein the second game media corresponds to a second plurality of electronic cards that are automatically selected by the server, and wherein the first game media and the second game media are displayed in the electronic card game using computer graphics that are provided within the graphical user interface;

creating a medium group including the first game media and the second game media;

performing, by using the medium group, the electronic card game based on an operation by the player;

determining that at least one of the first game media is managed in association with identification information of the first player terminal; and determining whether to manage at least one of the second game media in association with the identification information of the first player terminal based on a game result of the electronic card game.

2. A non-transitory computer readable medium storing an information processing program according to claim 1, wherein the method further comprises:

selecting third game media from the medium group based on a game medium selection operation by the player; and running, based on a battle start operation by the player, a battle game using the third game media.

3. A non-transitory computer readable medium storing an information processing program according to claim 2, wherein, in response to selecting the third game media from the medium group based on an input from the player, the method further comprises performing control to display the first game media and the second game media in such forms that the first game media and the second game media are identifiable from each other.

4. A non-transitory computer readable medium storing an information processing program according to claim 1, wherein, regarding a predetermined game medium of which a winning probability is set to be lower than other game media in the first draw table, the winning probability in the second draw table is set to be higher than the winning probability in the first draw table.

5. A non-transitory computer readable medium storing an information processing program according to claim 1,
wherein a rarity is set for each of the first game media and the second game media in the electronic card game, and
wherein the method further comprises creating the second draw table by extracting, from the first draw table, information corresponding to game media having a predetermined rarity is further provided.

6. A non-transitory computer readable medium storing an information processing program according to claim 1,
wherein an attribute is set for each of the first game media and the second game media in the electronic card game,
wherein the method further comprises:
determining the first game media by performing a draw based on a first draw table corresponding to an attribute selected based on an input from the player; and
determining the second game media by performing a draw based on a second draw table corresponding to the attribute selected based on the input from the player.

7. A non-transitory computer readable medium storing an information processing program according to claim 1, wherein the second game media managed in association with the identification information of the player are made available to the player in games other than the electronic card game.

8. An information processing device comprising:
at least one memory device storing an information processing program and;
at least one processor configured to execute the information processing program to cause the information processing device to perform a method comprising:
receiving a predetermined game selection for an electronic card game, wherein the predetermined game selection corresponds to a battle between a player associated with a first player terminal and a plurality of players associated with a plurality of player terminals communicating over a network;
receiving a card selection of a first plurality of electronic cards, wherein the card selection is performed by a card selection operation in a graphical user interface, and wherein the card selection is transmitted over the network to a server;

determining first game media by performing a draw based on a first draw table based on the card selection of the first plurality of electronic cards;

determining second game media by performing a draw based on a second draw table based on the predetermined game selection by the player, wherein the second game media corresponds to a second plurality of electronic cards that are automatically selected by the server, and wherein the first game media and the second game media are displayed in the electronic card game using computer graphics that are provided within the graphical user interface;

creating a medium group including the first game media and the second game media;

performing, by using the medium group, the electronic card game based on an operation by the player;

determining to manage at least one of the first game media in association with identification information of the first player terminal; and determining whether to manage the second game media in association with the identification information of the first player terminal based on a game result of the electronic card game.

9. An information processing system comprising a first player terminal and a server communicatively connected to the first player terminal, wherein:

the first player terminal is configured to perform a first method comprising:

accepting an input of an operation from a player, wherein the input corresponds to a predetermined game selection for an electronic card game and a card selection of a first plurality of electronic cards, reporting the operation of the player to the server, and performing, with respect to the player, an output based on a report from the server, and the server is configured to perform a second method comprising:

receiving, from the first player terminal, the predetermined game selection for the electronic card game, wherein the predetermined game selection corresponds to a battle between the player associated with the first player terminal and a plurality of players associated with a plurality of player terminals communicating over a network;

receiving, from the first player terminal, the card selection of the first plurality of electronic cards, wherein the card selection is performed by a card selection operation in a graphical user interface on the first player terminal, and wherein the card selection is transmitted by the first player terminal over the network to the server;

determining first game media by performing a draw based on a first draw table based on the card selection of the first plurality of electronic cards, determining second game media by performing a draw based on a second draw table based on the predetermined game selection by the player, wherein the second game media corresponds to a second plurality of electronic cards that are automatically selected by the server, and wherein the first game media and the second game media are displayed in the electronic card game using computer graphics that are provided within the graphical user interface, creating a medium group including the first game media and the second game media, performing, by using the medium group, the electronic card game based on the operation by the player, determining to manage at least one of the first game media in association with identification information of the player; and determining whether to manage at least one of the second game media in association with the identification information of the player based on a game result of the electronic card game.

\* \* \* \* \*